United States Patent
Cronie et al.

(10) Patent No.: US 9,014,295 B1
(45) Date of Patent: Apr. 21, 2015

(54) METHODS AND SYSTEMS FOR POWER-EFFICIENT INDUCTIVE CHIP-TO-CHIP COMMUNICATIONS

(71) Applicant: Kandou Labs, S.A., Lausanne (CH)

(72) Inventors: Harm Cronie, Lausanne (CH); Amin Shokrollahi, Preverenges (CH); Roger Ulrich, Schliern bei Köniz (CH)

(73) Assignee: Kandou Labs, S.A. (CH)

( * ) Notice: Subject to any disclaimer, the term of this patent is extended or adjusted under 35 U.S.C. 154(b) by 0 days.

(21) Appl. No.: 13/964,854

(22) Filed: Aug. 12, 2013

(51) Int. Cl.
  *H04L 25/34* (2006.01)
  *H04B 5/00* (2006.01)
  *H04L 25/49* (2006.01)

(52) U.S. Cl.
  CPC .......... *H04B 5/0031* (2013.01); *H04L 25/4925* (2013.01)

(58) Field of Classification Search
  CPC ............ H04L 25/4919; H04L 25/4917; H04L 25/0272; H04L 25/4925; H03M 5/20
  USPC ............................. 375/286–289, 292; 341/56
  See application file for complete search history.

(56) References Cited

U.S. PATENT DOCUMENTS

| | | | | |
|---|---|---|---|---|
| 5,283,664 | A * | 2/1994 | Fujisawa et al. | 382/251 |
| 6,075,350 | A * | 6/2000 | Peng | 323/207 |
| 7,492,134 | B2 * | 2/2009 | Tang et al. | 323/241 |
| 2011/0268225 | A1 | 11/2011 | Cronie et al. | |
| 2011/0302478 | A1 | 12/2011 | Cronie et al. | |
| 2012/0213299 | A1 | 8/2012 | Cronie et al. | |
| 2013/0127556 | A1 * | 5/2013 | Hori | 332/106 |

OTHER PUBLICATIONS

Tadahiro Kuroda, Proximity Inter-Chip Communication, 8th International Conference on Solid-State and Integrated Circuit Technology, pp. 1841-1844, Oct. 23-26, 2006.
Noriyuki Miura, et al. A 195-Gb/s 1.2-W Inductive Inter-Chip Wireless Superconnect with Transmit Power Control Scheme for 3-D-Stacked System in a Package, IEEE Journal of Solid-State Circuits, vol. 41, No. 1, pp. 23-34, Jan. 2006.
Non-published U.S. Appl. No. 13/463,742, filed May 3, 2012, entitled "Finite State Encoders and Decoders for Vector Signaling Codes".
Non-published U.S. Appl. No. 13/542,599, filed Jul. 5, 2012, entitled "Methods and Circuits for Efficient Processing and Detection of Balanced Codes".

* cited by examiner

*Primary Examiner* — Don N Vo
(74) *Attorney, Agent, or Firm* — Invention Mine LLC

(57) ABSTRACT

Digital information is communicated between stacked integrated circuit devices by inductive coupling between arrays of inductors formed from integrated circuit wiring layers. This can be done using a combination of push-pull drivers, common inductor return legs, and balanced sparse ternary encoding. Embodiments result in low power utilization and high pin efficiency.

15 Claims, 33 Drawing Sheets

$s_i(t)$
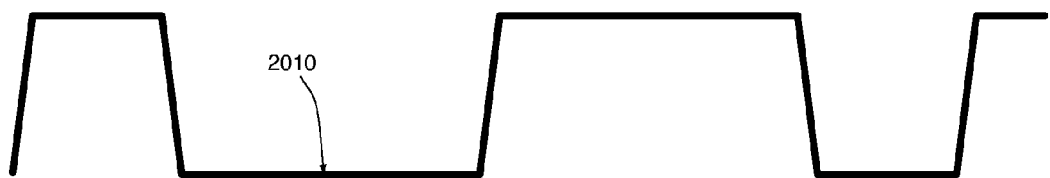
2010
$r_i(t)$
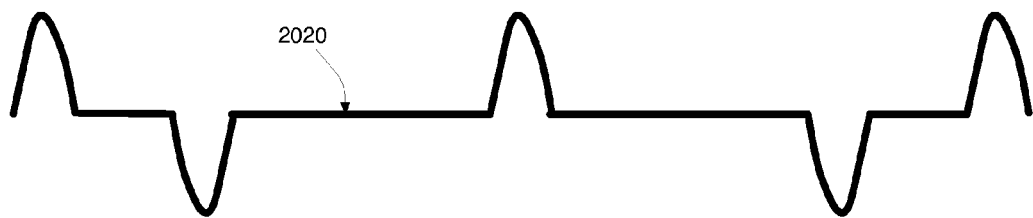
2020
Fig. 20

METHODS AND SYSTEMS FOR POWER-EFFICIENT INDUCTIVE CHIP-TO-CHIP COMMUNICATIONS

CROSS REFERENCES

The following references are herein incorporated by reference in their entirety for all purposes:

U.S. Patent Publication 2011/0268225 of application Ser. No. 12/784,414, filed May 20, 2010, naming Harm Cronie and Amin Shokrollahi, entitled "Orthogonal Differential Vector Signaling" (hereinafter "Cronie I")

U.S. Patent Publication 2011/0302478 of application Ser. No. 12/982,777, filed Dec. 30, 2010, naming Harm Cronie and Amin Shokrollahi, entitled "Power and Pin Efficient Chip-to-Chip Communications with Common-Mode Resilience and SSO Resilience" (hereinafter "Cronie II".)

U.S. Patent Publication 2012/0213299 of application Ser. No. 13/030,027, filed Feb. 17, 2011, naming Harm Cronie, Amin Shokrollahi and Armin Tajalli, entitled "Methods and Systems for Noise Resilient, Pin-Efficient and Low Power Communications with Sparse Signaling Codes" (hereafter called "Cronie III".)

U.S. patent application Ser. No. 13/463,742, filed May 3, 2012, naming Harm Cronie and Amin Shokrollahi entitled "Finite State Encoders and Decoders for Vector Signaling Codes" (hereafter called "Cronie IV".)

U.S. patent application Ser. No. 13/542,599, filed Jul. 5, 2012, naming Armin Tajalli, Harm Cronie, and Amin Shokrollahi, entitled "Methods and Circuits for Efficient Processing and Detection of Balanced Codes" (hereafter called "Tajalli I".)

The following additional references have been cited in this application:

Miura, N.; Mizoguchi, D.; Inoue, M.; Sakurai, T.; Kuroda, T.; "A 195-gb/s 1.2-W inductive inter-chip wireless superconnect with transmit power control scheme for 3-D-stacked system in a package," Solid-State Circuits, IEEE Journal of, vol. 41, no. 1, pp. 23-34, Jan. 2006 (hereafter called "Miura I".)

Kuroda, T.; "Proximity Inter-Chip Communication," ICSICT '06. 8th International Conference on Solid-State and Integrated Circuit Technology, pp. 1841-1844, 23-26 Oct. 2006 (hereafter called "Kuroda I".)

FIELD OF THE INVENTION

The present invention relates to communications in general and in particular to transmission of signals capable of conveying information.

BACKGROUND

In many electronic devices, communication plays an important role regardless of the function these electronic devices fulfill. Most modern electronic devices contain integrated circuits ("IC") containing circuitry on a silica component, for example, that exchange information with one another. An example is the communication between a processor and memory.

Often it is not possible to integrate all required functionality of an electronic device into a single IC, either because of the overall system complexity, or because different IC processes are required to implement the different functionalities. As an example, processors are typically manufactured using a different IC process than that used for memory devices, with each of these IC processes being highly optimized for its particular application.

The transfer of information from one silicon component to another is referred to herein as "chip-to-chip communications." In chip-to-chip communications, silicon components may be connected by wires. Multiple such wires constitute a communication bus. A wire is considered as a path connecting two silicon components and may include elements such as die bonding pads, bumps, and bond wires, as well as circuit board pads, traces, and vias. Other embodiments may include passive components such as coupling capacitors and termination resistors in the chip-to-chip interconnection path.

In general, one would like chip-to-chip communications to be very reliable. Error rates on the order of one error per 1012 bits transmitted, or even lower, are typically required. Furthermore, the power consumption of the circuitry used for communicating has to be low. It is difficult to achieve both low-power and reliable communication goals. A certain amount of power is required to maintain signal integrity. Signal integrity may be degraded since wires may not be ideal, leading to signal distortion, attenuation, and interference.

A key parameter that influences signal integrity is the length of the wires. Long wires attenuate signals more and degrade the quality of the signals. Fundamentally, more power is required to drive longer wires.

A solution to the signal integrity problem is to bring the silicon components closer together. This would shorten the path between the silicon components and improve signal integrity and power consumption. Integrating both components on the same die would minimize the distance. However, because of cost and yield issues it is not always possible to integrate all components on the same die. Solutions that allow the length of inter-chip communication wires to be shortened include carefully designed printed circuit boards, package-on-package multi-chip configurations, and die-to-die interconnections using techniques such as through silicon vias (TSVs).

FIG. 1 is an example of a known chip-to-chip communication system, based on a printed circuit board 110 on which a processor 100, a memory device 120 and a memory device 130 are mounted. The processor 100 may communicate with memory device 120 by the wires 122 and with memory device 130 by the wires 124. The disadvantage of the architecture exemplified in FIG. 1 is that it is difficult to shorten the length of the wires to improve the signal integrity and lower the power consumption.

FIG. 2 shows an example of how multichip packaging may be used to reduce the length of signal paths such as those of FIG. 1. A first memory die 220 may be mounted on top of package substrate 210. The connection from memory die 220 to package bumps 240 comprises bondwires 230 and package trace 231. A second memory die 222 is mounted on top of memory die 220. The connection from memory die 222 to package bumps 240 comprises bondwires 232 and package trace 233.

Although integrating multiple dies into the same package as is illustrated in FIG. 2 is beneficial, some problems remain. First, the cost of a package as illustrated in FIG. 2 is more expensive than integrating a single die in a package. Second, although signal paths are much shorter than those of the previous figure, bondwires 230, 232 have a parasitic inductance that may induce crosstalk, and package traces 231, 233 and bumps 240 may introduce an additional loss in signal integrity.

To bring the processor still closer to the memory dies, one can opt for a package-on-package ("PoP") design as exemplified in FIG. 3. FIG. 3 shows a processor die 312 that is mounted on a first package 310. Two memory dies 322 are mounted on a second package 320. The second package 320 is mounted on top of the first package 310 and the connection is made through bumps 330. The advantage of the configuration shown in FIG. 3 is that the path from memory devices 322 to processor die 312 is substantially shortened. However, there are still disadvantages to this package-on-package configuration. First, the costs of the full package are increased substantially, as the process of wire-bonding multiple dies is not easy. Second, the bond wires may still pose a challenge for signal integrity, with crosstalk still capable of degrading signals transmitted from memory dies 322 to processor die 312 and vice versa.

Another technology to combine multiple dies into a single package is the use of through-silicon vias. FIG. 4 shows an example of a package 410 on which a processor die 420 is mounted. Memory dies 430, 432 are mounted on top of the processor die 420. The conductive connection between processor die 420 and memory dies 430, 432 is made with through-silicon via ("TSV") 440. Memory die 430 is connected to memory dies 432 by through-silicon vias 442 (and also by TSV 440 in some cases). One advantage of through-silicon vias is that the path between processor die 420 and the memory dies is substantially shortened. The use of through-silicon vias is known to have several disadvantages. First, the cost of the process to make through-silicon vias is very high, and the complexity of the process is such that it is very difficult to obtain high production yields. Second, there is low tolerance to misalignments of the individual dies. Third, such a direct non-flexible mechanical connection between dies will undergo shear stress when the two dies undergo differential thermal expansion, possibly to the point of destruction.

An alternative to TSVs is to couple two dies in a capacitive manner. FIG. 5 exemplifies a package 510 on which a processor die 520 is mounted. On top of processor die 520, a memory die 530 is mounted. Processor die 520 comprises a metal plate 540 and memory die 530 comprises a metal plate 542. The two metal plates 540, 542 are separated by a dielectric 544 and thus form a capacitor. A voltage induced on one of the capacitor plates 540, 542 may be sensed on the other plate. To provide sufficient coupling the distance between the two plates 540, 542 should be as small as possible. An advantage of capacitive coupling between chips is that mechanical stress between processor die 520 and memory die 530 is eliminated. A downside for capacitive coupling is that the two chips have to be mounted in a face-up/face-down manner to provide the necessary small distance between capacitor plates. That restricts the number of dies that can be stacked in this manner to two. Another downside of capacitive coupling is that the amount of power required for communications is relatively high.

An alternative to capacitive coupling is illustrated in FIG. 6. In FIG. 6, a package 610 contains a processor die 620 and two memory dies 630 and 632. Processor die 620 has an integrated inductor 640 that may be coupled to inductors 642, 643 that are integrated on memory dies 630, 632, respectively. The coupled inductors 640, 642 and 643 can be used to communicate between the different dies. An advantage of inductive coupling is that mechanical stress between dies is eliminated. There is more packaging flexibility than with capacitive coupling, as dies do not have to be mounted in a face-up/face-down manner, which allows stacking of more than two devices.

The disadvantage of inductive coupling has been acknowledged to be the amount of power required to achieve reliable communications over distances sufficiently large to support a large variety in die configurations. What is therefore needed are methods for communication between multiple dies that offer flexibility in die configurations and spacing, and that are very low power.

BRIEF SUMMARY

Using known inductive coupled communication or novel inductive coupled communication between stacked integrated circuit devices, group coding method and apparatus are used with such coupled arrays of inductors, to achieve benefits such as reduced power utilization with high communications efficiency.

An optimum code for such an application is preferably closely coupled to the transmission characteristics of the inductively coupled communications channel. In particular, sparse balanced vector signaling codes might be used, especially when coupled with particular inductive array topologies that enable use of simple and power efficient driver designs.

BRIEF DESCRIPTION OF THE DRAWINGS

Various embodiments in accordance with the present disclosure will be described with reference to the drawings. Same numbers are used throughout the disclosure and figures to reference like components and features.

FIG. 20 is an example of transmitted and received signals for the embodiment of FIG. 19.

DETAILED DESCRIPTION

Figure 7:
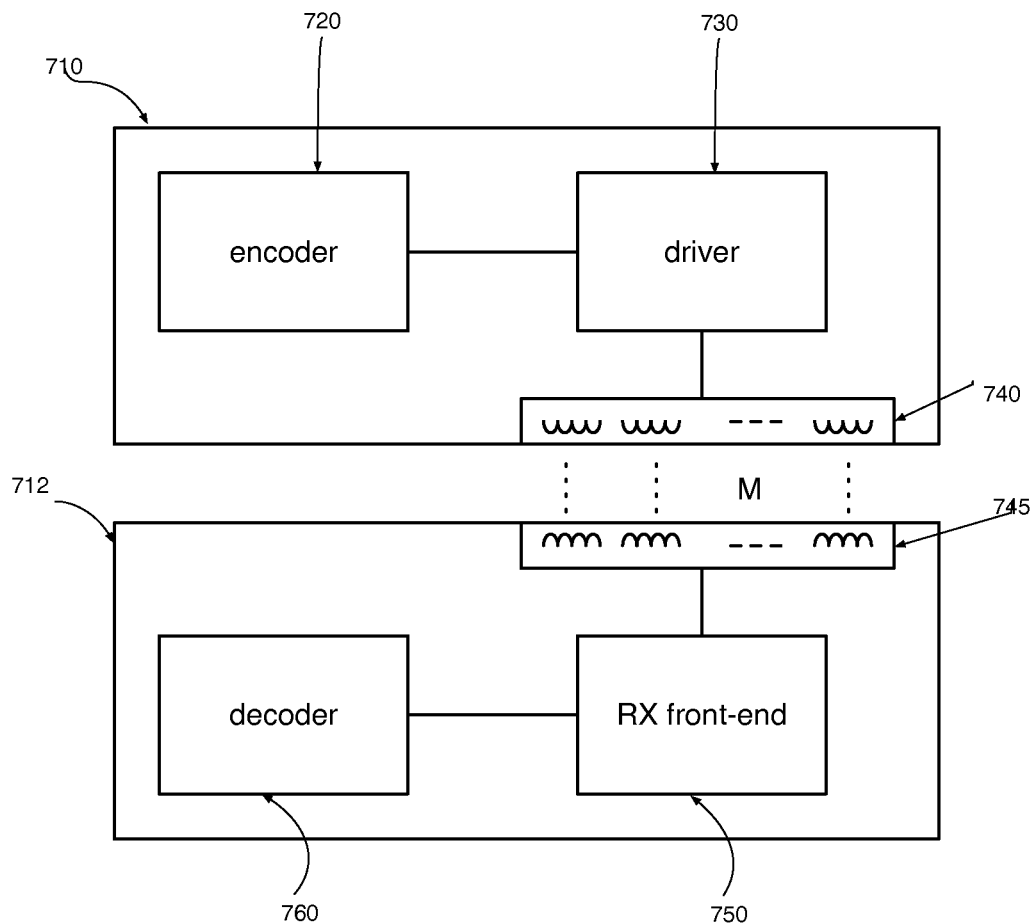
FIG. 7 is a block diagram of chip-to-chip inductive communications in accordance with at least one embodiment.

An embodiment is described with reference to FIG. 7, showing a first silicon component 710 and a second silicon component 712. In one example of such embodiment, the first silicon component 710 may be a processor and the second silicon component 712 may be a memory device. The silicon components 710, 712 are inductively coupled by an inductor array 740 and an inductor array 745, each comprising some number, M, of inductors. The first silicon component 710 may comprise a driver 730 that drives the inductor array 740. The information available in silicon component 710 may be encoded by an encoder 720 whose output is fed to the driver 730. Encoder 720 may perform operations upon its input information that lead to reduced power consumption in driver 730 and inductor array 740, and improved signal quality and reliability as measured at a decoder 760. The second silicon component 712 may comprise a receiver front-end 750. The receiver front-end 750 senses the outputs of the inductor array 745, for which it may perform amplification. The outputs of the receiver front-end 750 are sent to the decoder 760. A task of the decoder 760 is to reconstruct the original information bits.

Coupled Inductor Arrays

Inductor arrays may be used to couple two or more different integrated circuits and/or dies.

As is well known from electrical theory, a current through an inductor produces a magnetic field, and changes in that inductor current will result in a changing magnetic field. Similarly, a current may be induced in an inductor exposed to a changing magnetic field. Thus, if a primary and a secondary inductor are coupled magnetically, changes of current in the primary inductor will induce current changes in the secondary inductor, with the induced secondary current being proportional to the differential of the primary inductor current.

Figure 8:
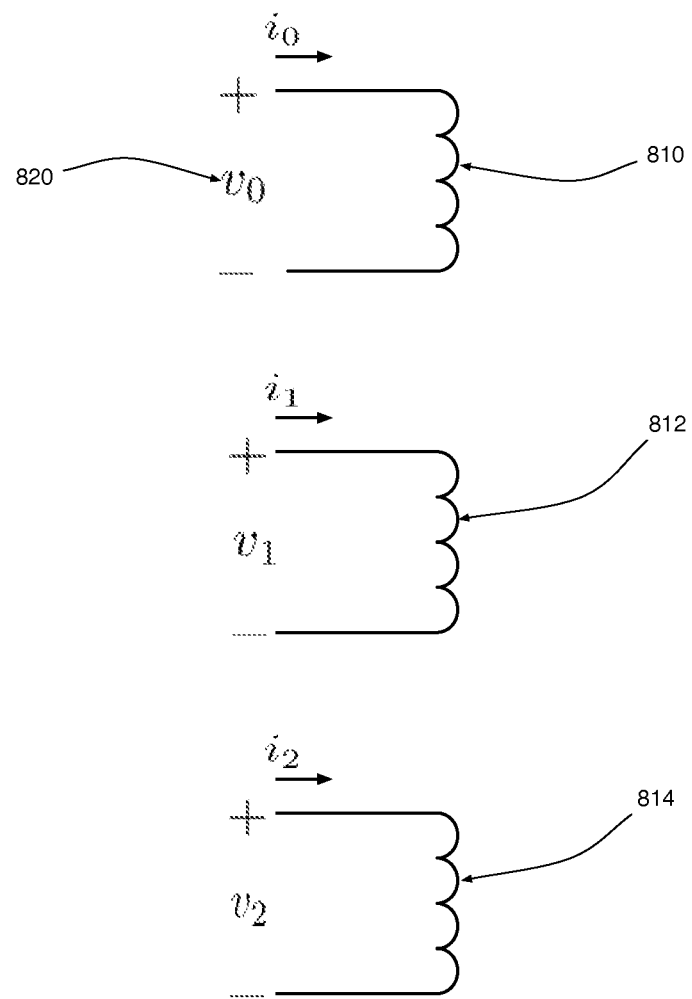
FIG. 8 illustrates an array of three inductors in a Type I configuration.

Furthermore, an inductor array may be arranged in different configurations. A schematic of one embodiment of an inductor array is shown in FIG. 8. The inductor array may be used in transmission and/or reception mode. The inductor array shown in FIG. 8 comprises three separate inductors 810, 812 and 814. Those inductors might comprise portions of one or more of the inductor arrays shown in FIG. 7. Each of these inductors has two input legs. The voltage 820 across the two input legs of inductor 810 is denoted herein by v0. In a similar way, the voltage across the input legs of inductor 812 is denoted by v1, and the voltage across the input legs of inductor 814 by v2.

Figure 9:
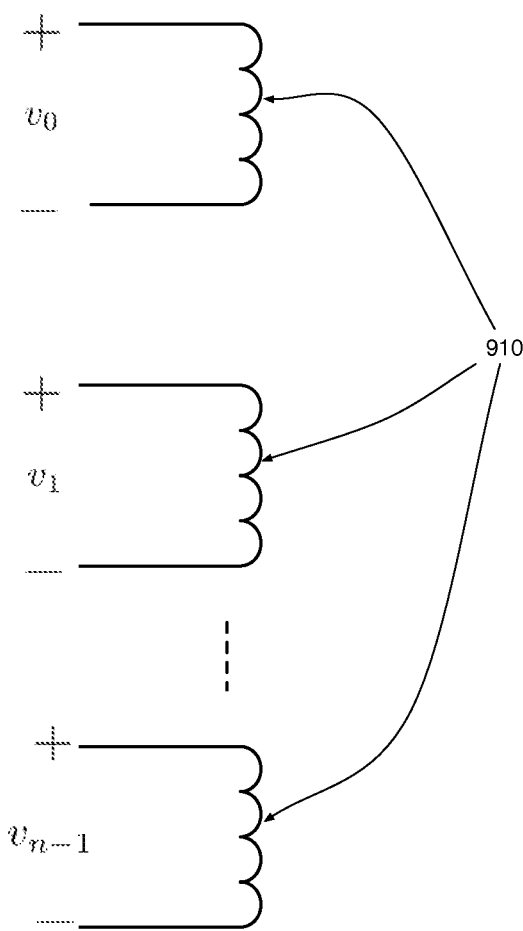
FIG. 9 illustrates an array of multiple inductors in a Type I configuration.

The array configuration of FIG. 8 may be extended to more than three inductors as is exemplified in the further embodiment of FIG. 9. FIG. 9 shows n inductors 910 where each inductor has two input legs. The voltage across the i-th inductor is denoted by vi. For the purpose of this disclosure, the specific inductor architecture as shown in FIGS. 8 and 9 is referred to as a Type I configuration. A Type I inductor array may comprise n inductors where each inductor comprises two input legs. In a Type I inductor array, none of the legs of the inductors are connected with one other.

Figure 10:
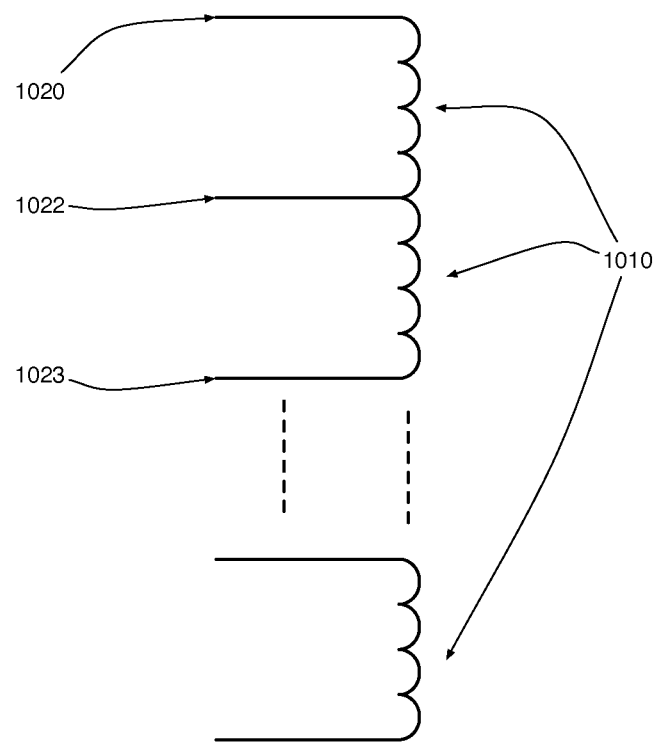
FIG. 10 illustrates an array of inductors in a Type II configuration.

In another embodiment, the inductor array is arranged as exemplified in FIG. 10. The inductor array of FIG. 10 may comprise n inductors 1010. Each of these inductors has two input legs where at least one of the legs is shared with a neighboring inductor. For example, the first inductor has input legs 1020 and 1022. The input leg 1022 is shared with the second inductor, which has input legs 1022 and 1023. The array configuration of FIG. 10 is called a Type II configuration.

Figure 11:
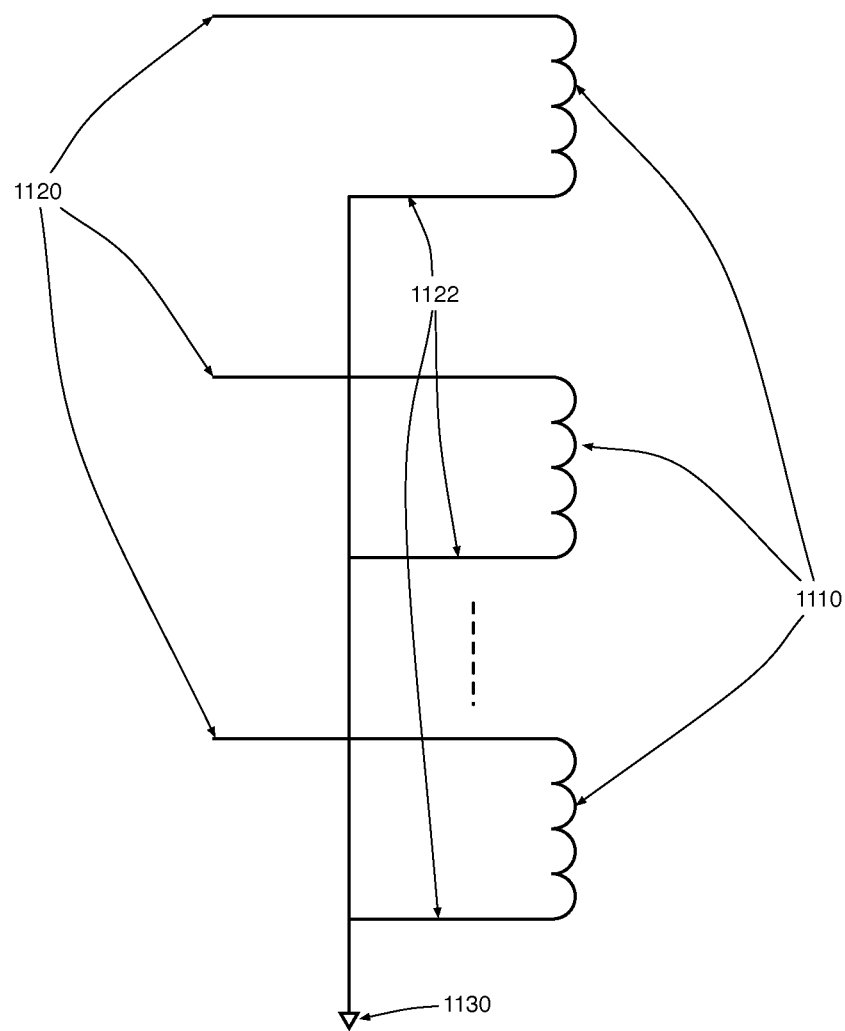
FIG. 11 illustrates an array of inductors in a Type III configuration.

In another embodiment, the inductors of the inductor array are arranged as shown in FIG. 11. The n inductors shown in FIG. 11 may comprise two input legs where the input 1120 of the inductor array comprises the first of these input legs (which each can be connected to distinct inputs). All the second input legs 1122 of the inductors 1110 are connected to a common node 1130. In some embodiments, common node 1130 may be held at a fixed potential or connected to ground. The configuration of FIG. 11 is referred to as a Type III inductor array configuration.

Figure 12:
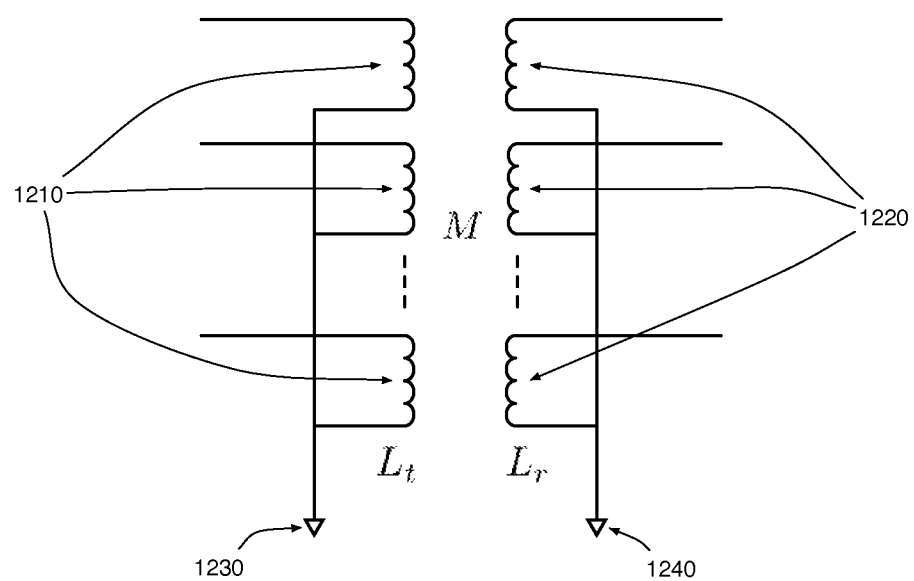
FIG. 12 is a schematic of two coupled inductor arrays.

As is exemplified in FIG. 7, both dies of components 710 and 712 incorporate an inductor array 740, 745. These inductor arrays are magnetically coupled once the dies are brought close to one other. A schematic overview of two coupled inductor arrays is shown in FIG. 12. The first inductor array, Lt, comprises n1 inductors 1210, where the one of the legs of each of these n1 inductors is connected to common node 1230. The second inductor array, Lr, comprises n2 inductors 1220 where one of the legs of each of these n2 inductors is connected to a common node 1240. Both inductor arrays in FIG. 12 employ a Type III configuration. Other embodiments may employ a Type I or II configuration for the two arrays, or may incorporate different configurations for each of the two coupled arrays. In some embodiments n1≠n2, but in other embodiments, n1=n2.

Many different types of inductor array configurations may be chosen, as one of moderate skill in the art will recognize upon reading this disclosure. The inductor arrays that are specifically mentioned in this disclosure are given for the purpose of illustration and should not be considered as limiting the scope of present disclosure.

Integrated Inductor Arrays

Figure 13:
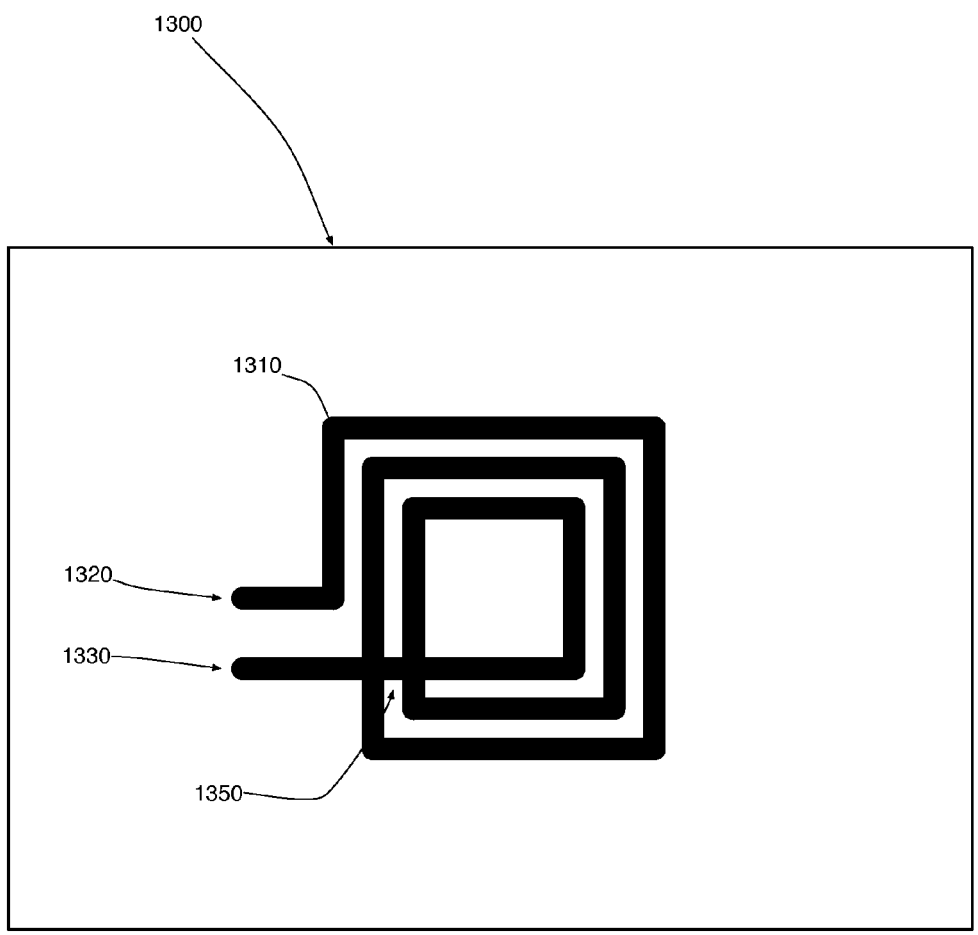
FIG. 13 shows part of a die incorporating an inductor in accordance with at least one embodiment.

FIGS. 8-12 are schematic diagrams of example inductor arrays. In modern integrated technologies, inductors may be implemented on-chip, as exemplified by the single inductor of FIG. 13. That figure shows part of a die 1300 on which an inductor 1310 is fabricated. The inductor has two legs 1320 and 1330. Inductor 1310 may be fabricated of metal wires that are available in the process technology. A typical inductor incorporates one or more turns of metal wire on each of one or more metal layers of the integrated circuit process, with transitions between layers used to avoid shorts between turns, as at 1350. An embodiment using a type I configuration of an inductor array that may be integrated on a chip is exemplified in FIG. 14.

Figure 14:
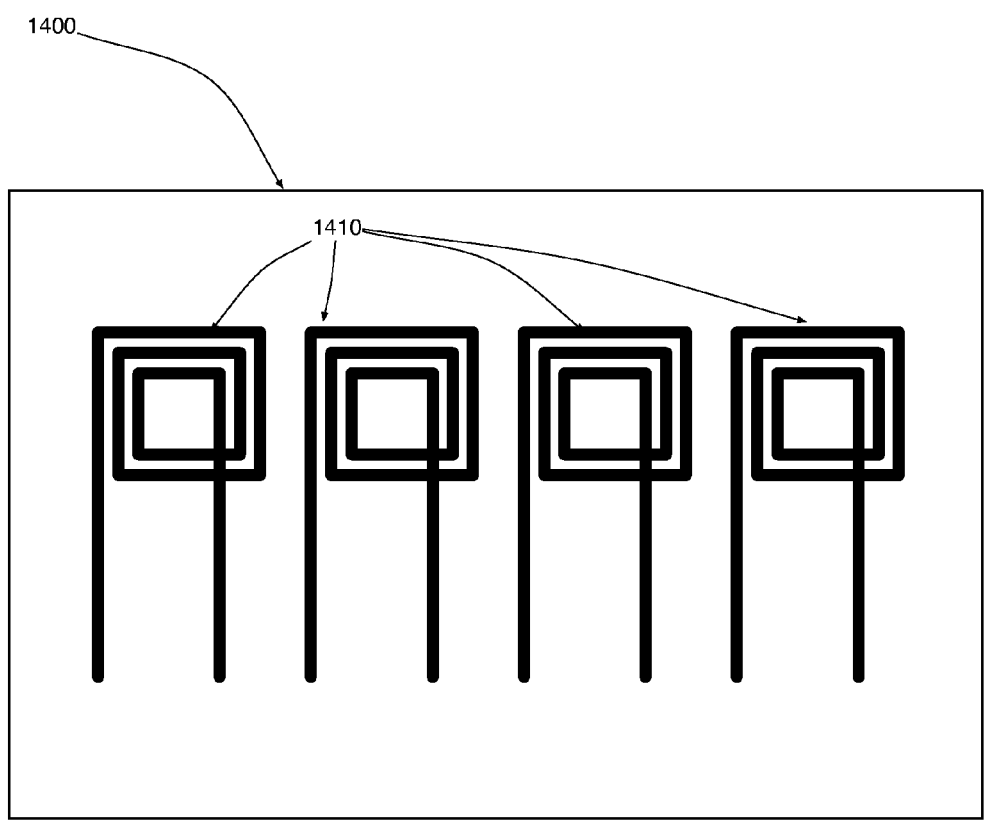
FIG. 14 shows part of a die incorporating a Type I inductor array in accordance with at least one embodiment.
Figure 15:
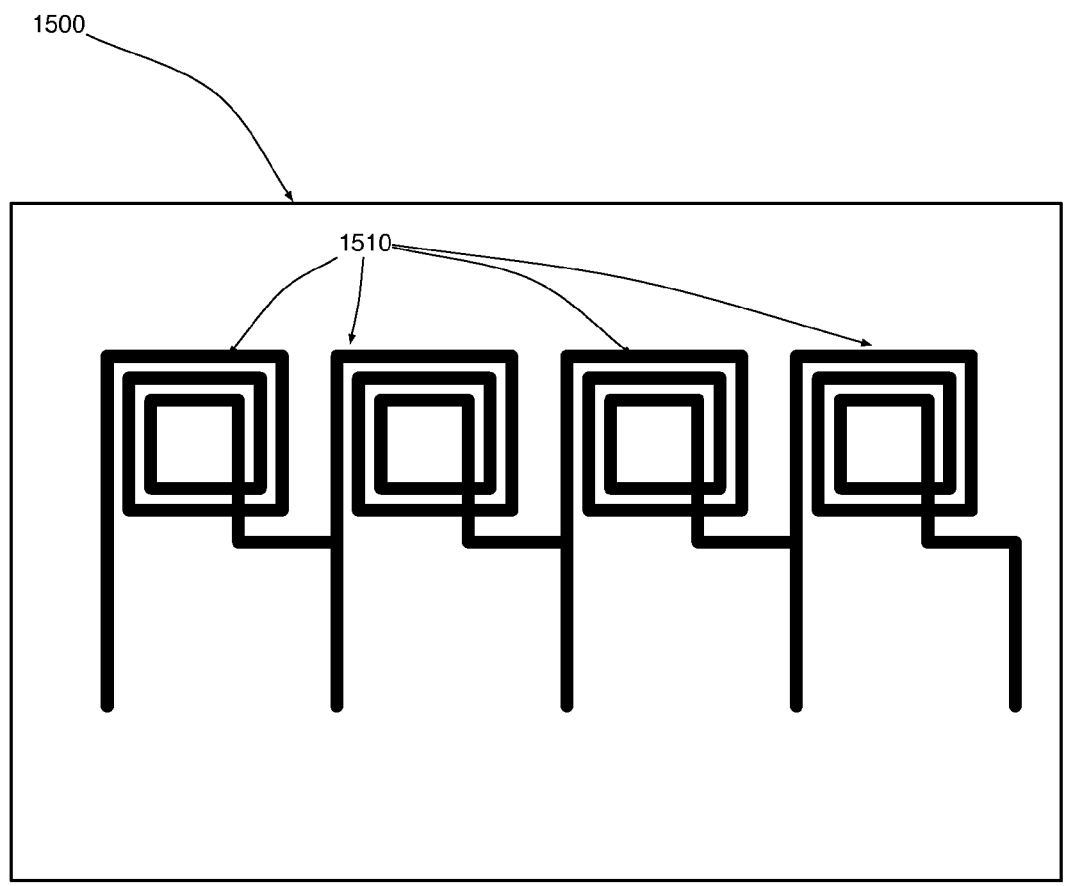
FIG. 15 shows part of a die incorporating a Type II inductor array in accordance with at least one embodiment.
Figure 16:
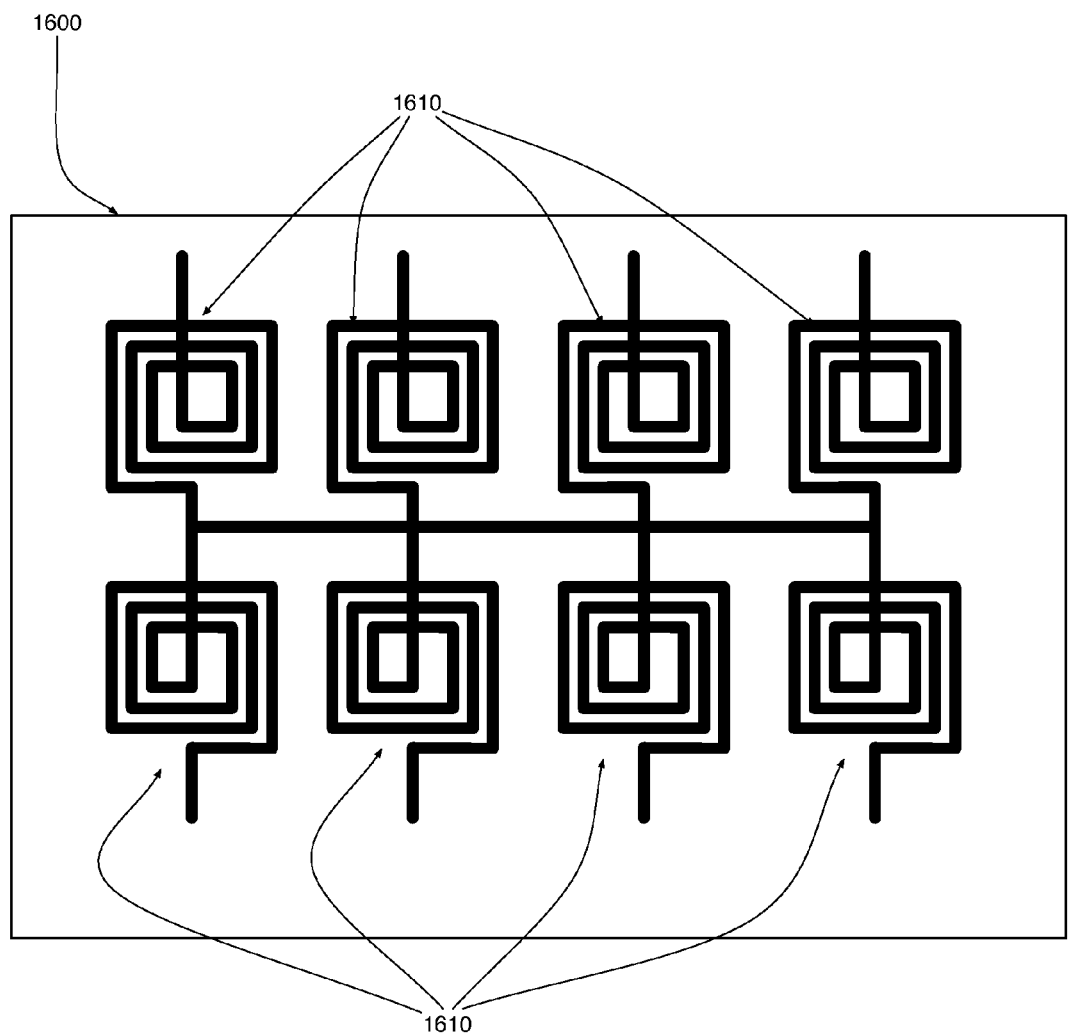
FIG. 16 shows part of a die incorporating a Type III inductor array in accordance with at least one embodiment.

FIG. 14 shows part of a die 1400 on which four inductors 1410 are integrated. Another embodiment using a type II configuration of an inductor array that may be integrated on a chip is exemplified in FIG. 15. FIG. 15 shows part of a die 1500 on which four inductors 1510 are integrated. A further embodiment using a type III configuration of an inductor array that may be integrated on a chip is exemplified in FIG. 16. FIG. 16 shows part of a die 1600 on which eight inductors 1610 are integrated.

General Signaling on Coupled Inductor Arrays

Coupled inductor arrays can be used to transfer information from one chip to one other. For this purpose, an array driver generates currents through, or voltages across, the legs of the inductor array. An embodiment of a driver that generates signals for a conductor array is now further described with reference to FIG. 17.

Figure 17:
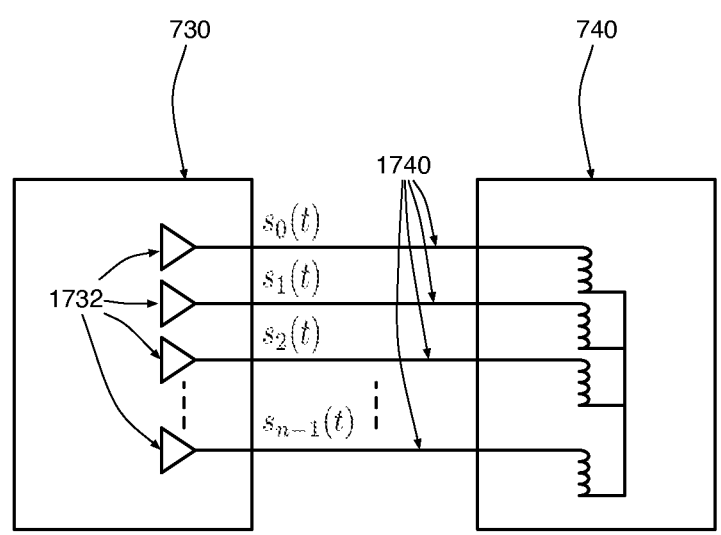
FIG. 17 shows one embodiment with drivers generating signals for an inductor array.

FIG. 17 shows a driver 730 that is connected to an inductor array 740. The inductor array has n legs 1740. The driver 730 comprises n driver elements 1732 and each of these driver elements is connected to one leg of the inductor array 740. The driver 730 may generate signals $s0(t), \ldots, sn-1(t)$ where it should be understood that signal $si(t)$ is generated for the i-th leg of the inductor array. The signals $s0(t), \ldots, sn-1(t)$ are physical signals and may represent voltages and/or currents induced on the legs of the inductor array 740. The vector containing the signals $s0(t), \ldots, sn-1(t)$ is denoted by $s(t)$.

In an embodiment, the signals generated by the driver 730 have the form as given by Equation 1.

$$s(t) = c \cdot p(t) \quad \text{(Eqn. 1)}$$

In Equation 1, c denotes a vector comprising n real numbers and $p(t)$ denotes a pulse shape. In some embodiments, the vector c may change every T seconds. The quantity "T seconds" is called the symbol period. The symbol period is typically chosen as a fraction of a second and values in the order of several hundreds of picoseconds may be preferable. Many pulse shapes may be chosen and several embodiments are exemplified in FIG. 18.

Figure 18:
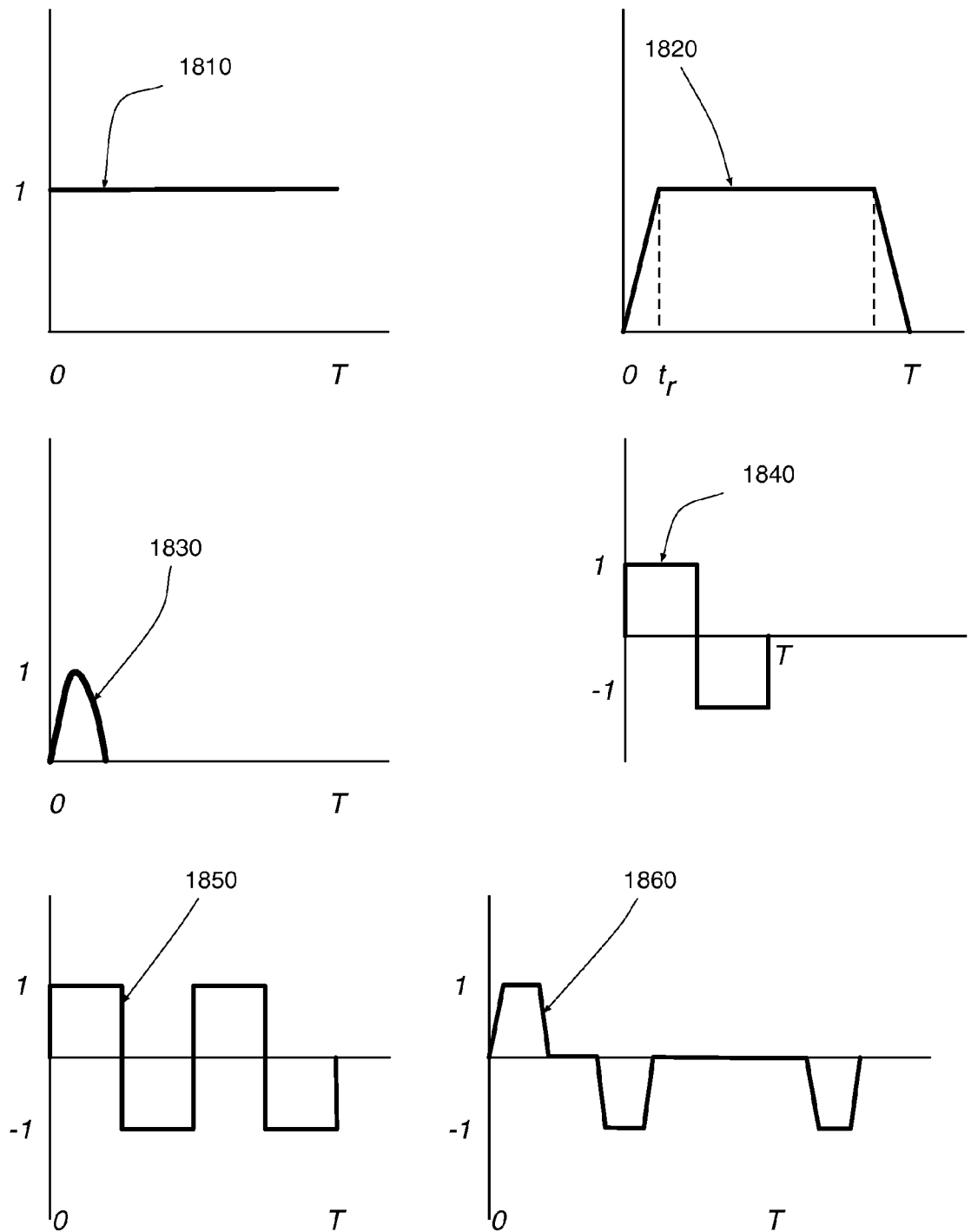
FIG. 18 shows waveforms for communication over coupled inductive channels.

FIG. 18 shows a pulse shape 1810 that is constant over a period of T seconds. This may correspond to a signal $si(t)$ that is a constant current and/or voltage on the i-th leg of the inductor array 740 for a duration of T seconds. The pulse shape 1820 has a finite rise-time 1820 which may be easier to implement and cause less unwanted interference. The pulse shape 1830 is a short Gaussian pulse that has a non-zero value only for part of the symbol period T. The so-called Manchester pulse 1840 is well known to one of skill in the art. The pulse shape 1850 comprises two periods of a Manchester pulse. The pulse shape 1860 provides another example. In some embodiments, the driver 730 may perform tasks such as amplification, attenuation and filtering before the legs of the inductor array are driven.

In an embodiment, the signals $s0(t), \ldots, sn-1(t)$ define currents into the legs of the inductor array 740. As one of skill in the art will recognize, these currents will define corresponding voltages across the legs of the inductor array. As such, in cases that the signals $s0(t), \ldots, sn-1(t)$ would define voltages, these voltages would also define current into the legs of the conductor array. Hence without loss of generality one may assume that the signals $s0(t), \ldots, sn-1(t)$ define currents. In some embodiments, inductor array 740 is coupled with an inductor array 745 integrated on another chip. Such an embodiment is now further described with reference to FIG. 19.

Figure 19:
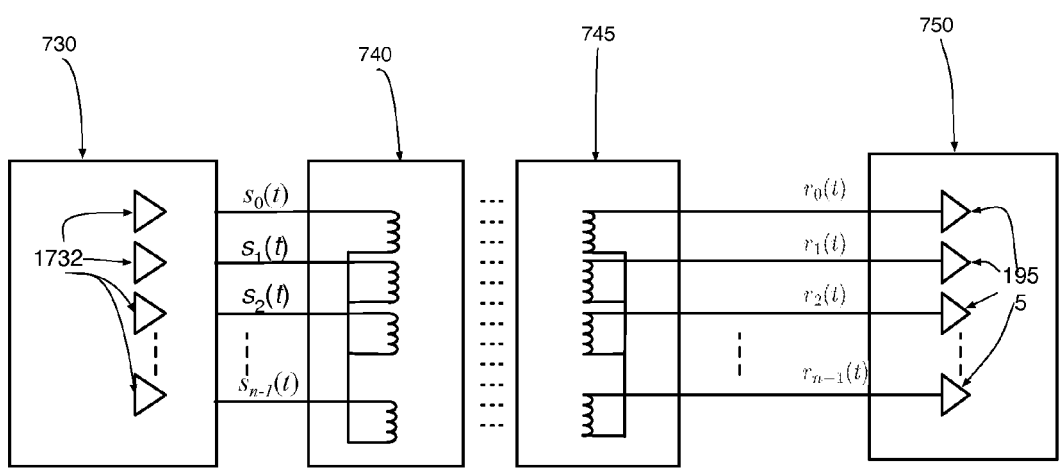
FIG. 19 is a block diagram of one embodiment communicating between a transmitter and a receiver using coupled inductive arrays.

FIG. 19 shows driver 730 driving the legs of inductor array 740 using driver elements 1732. Inductor array 740 is coupled to inductor array 745. The coupling between the two inductor arrays causes signals to develop in the n legs of inductor array 745 when inductor array 740 is driven by driver 730. These induced signals are denoted by $r0(t), \ldots, rn-1(t)$. These signals are sensed by the receiver (Rx) front-end 750, which may comprise amplifiers 1955 to amplify the signals. Furthermore, these amplifiers may perform additional tasks such as filtering.

An example of a signal $si(t)$ and a signal $ri(t)$ is shown in FIG. 20. The figure shows a waveform $si(t)$ 2010 that may be induced by the driver into the i-th leg of inductor array 740. At the receiver, the waveform $ri(t)$ 2020 may be induced at the i-th leg of inductor array 745. As one of moderate skill in the art will recognize, inductive coupling has a high-pass characteristic that can also be observed from waveform 2020.

The power required to communicate across inductor arrays is a very important factor in the practical applicability of some embodiments of inductive chip-to-chip communication systems. A substantial part of the power in such a system is the power dissipated by driver 730 and its inductive load 740. In at least one embodiment, the driver is connected to a positive power supply that has a value of Vdd Volts. The total instantaneous power consumed by the driver/inductor subsystem is given by the product of Vdd and the total current drawn from the power supply. When the input to the inductor array is generated according to Equation 1 the instantaneous power consumed by the driver is proportional to that shown in the right hand side of Equation 2:

$$P(t) \approx Vdd \cdot \frac{\|c\|_1}{2} \cdot p(t) \quad \text{(Eqn. 2)}$$

In Equation 2, the quantity 1101 denotes the L1-norm of the vector c, that is, the sum of the absolute values of the coordinates of c. It may be the case that only part of this power is used for the actual communications, depending on the efficiency of the output driver. In chip-to-chip communication, Vdd is typically fixed and the power consumption is determined by the choice of vectors c and the pulse shape used. To be able to bridge useful communication distances by inductive communications, the pulse shape $p(t)$ in Eqn. 1 should have considerable amplitude, thus contributing significantly to the power consumption. In this disclosure, it is shown how to construct chip-to-chip communication systems based on inductor arrays that allow for very low power consumption. One ingredient is a specific design of the set of c that is used for communications. The set of all c is called the signal constellation or code, this disclosure teaches how to design these signal constellations for low-power chip-to-chip communications with inductor arrays.

Low-Power Codes for Coupled Inductor Arrays

Figure 21:
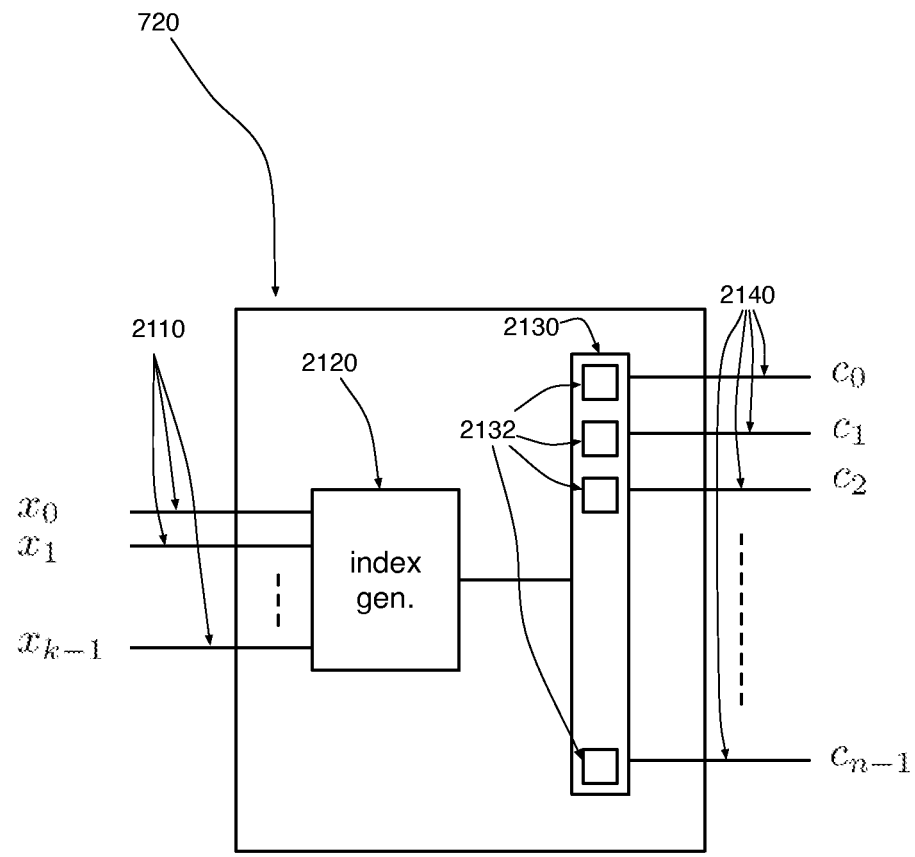
FIG. 21 shows one embodiment of an encoder.

One embodiment of an encoder 720 is now further described with reference to FIG. 21. FIG. 21 exemplifies an encoder 720 for an inductor array comprising n input legs. The input 2110 of encoder 720 comprises the sequence of bits $x_0, \ldots, x_{k-1}$ which is available in die 710 (not shown). A sequence of such bits may be available every T seconds. Encoder 720 comprises an index generator 2120 and a storage unit 2130. Storage unit 2130 will hold a vector c that represents an encoded version of the bits $x0, \ldots, xk-1$. For this purpose, the storage unit 2130 comprises n storage elements 2132. In some embodiments, the storage elements 2132 are all initialized to 0. Furthermore, index generator 2120 may generate indices for some of the components of c based on the input bits 2110. For example, where many of the components of c are zero, index generator 2120 may generate indices for only the non-zero components of c. In practical implementations, index generator 2120 may be implemented by a look-up-table (LUT) or a more efficient encoding process may be used. Other embodiments may implement the index generator and/or the LUT and its values in discrete digital logic or a programmed logic array.

One task of the encoder is to map each combination of input bits x0, . . . , xk−1 to a unique vector c. The set S of all c is called the "signal constellation" or "signaling code." The length, n, of the code S is defined as the length of the vectors c. The present disclosure describes a set of power efficient signaling codes. These signaling codes are referred to herein as sparse array codes.

TABLE 1

| C | c | C | c |
|---|---|---|---|
| 0,0,−1,1 | −1,0,0,1 | −1,0,1,0 | 0,0,0,0 |
| 0,0,1,−1 | 1,0,0,−1 | 1,0,−1,0 | −1,−1,1,1 |
| 0,−1,0,1 | 0,−1,1,0 | −1,1,0,0 | −1,1,1,−1 |
| 0,1,0,−1 | 0,1,−1,0 | 1,−1,0,0 | 1,1,−1,−1 |

Table 1 shows the code words of a balanced low-weight ternary code of length n=4. Furthermore, the code above consists of sixteen code words and it is easily verified that the code is ternary and balanced. The average number of zeroes per code word is equal to 1.75.

In an embodiment, encoder 720 may use the sparse array code as defined in Table 1. For this purpose, encoder 720 may employ the map as defined in Table 2 from the four bits $b_0$, $b_1$, $b_2$, $b_3$ to a code word, c.

TABLE 2

| $b_3b_2b_1b_0$ | c | $b_3b_2b_1b_0$ | c | $b_3b_2b_1b_0$ | c | $b_3b_2b_1b_0$ | c |
|---|---|---|---|---|---|---|---|
| 0000 | 0,0,0,0 | 0100 | 0,0,1,−1 | 1000 | 0,1,0,−1 | 1100 | 1,0,0,−1 |
| 0001 | 0,0,−1,1 | 0101 | 1,−1,−1,1 | 1001 | 0,1,−1,0 | 1101 | 1,0,−1,0 |
| 0010 | 0,−1,0,1 | 0110 | 0,−1,1,0 | 1010 | −1,−1,1,1 | 1110 | 1,−1,0,0 |
| 0011 | −1,0,0,1 | 0111 | −1,0,1,0 | 1011 | −1,1,0,0 | 1111 | −1,1,1,−1 |

Sparse array codes are defined by two properties that make them very power efficient in coupled inductor array communications. The first property is that all elements c of S satisfy Equation 3, namely that a sum of the representative physical value for each of the components is equal to a constant α which is the same for all code word.

$$\sum_{i=0}^{n-1} c_i = \alpha \qquad \text{(Eqn. 3)}$$

In some embodiments, the constant α is zero. A second desirable property of a sparse array code is that the average number of zeroes or quiescent values in each code word should be reasonable large.

The pin-efficiency r of a sparse array code is defined as in Equation 4.

$$r = \frac{k}{n}. \qquad \text{(Eqn. 4)}$$

The pin-efficiency measures the amount of bits transmitted per leg of the inductor array. For a fixed signaling rate, a higher pin-efficiency leads to a higher data rate. Before discussing the advantages of sparse array codes in detail, several families of sparse array codes are considered and several embodiments of sparse array codes are described.

Balanced Low-Weight Ternary Codes

In some embodiments, the sparse array code is a balanced low-weight ternary code of length n. A low-weight ternary code comprises code words c where the symbols of the code word take on only three values. Furthermore, on average the occurrence of one of these symbols is significantly higher than the other two symbols. Without loss of generality, one may assume that the symbols of the low-weight ternary code are given by −1, 0, 1 where the symbol that occurs with a significantly higher frequency is the 0 symbol. The low-weight ternary code is balanced if the sum of the entries of every code word is equal to the same constant number, as an example, 0. A first example of a balanced low-weight ternary code is given in Table 1.

In an embodiment, the encoder 720 may implement a LUT to implement this map. As one of ordinary skill in the art will recognize, one may use any other one-to-one map from bits $b_0, \ldots, b_3$ when a LUT is used by the encoder 720 to perform encoding.

Figure 22:
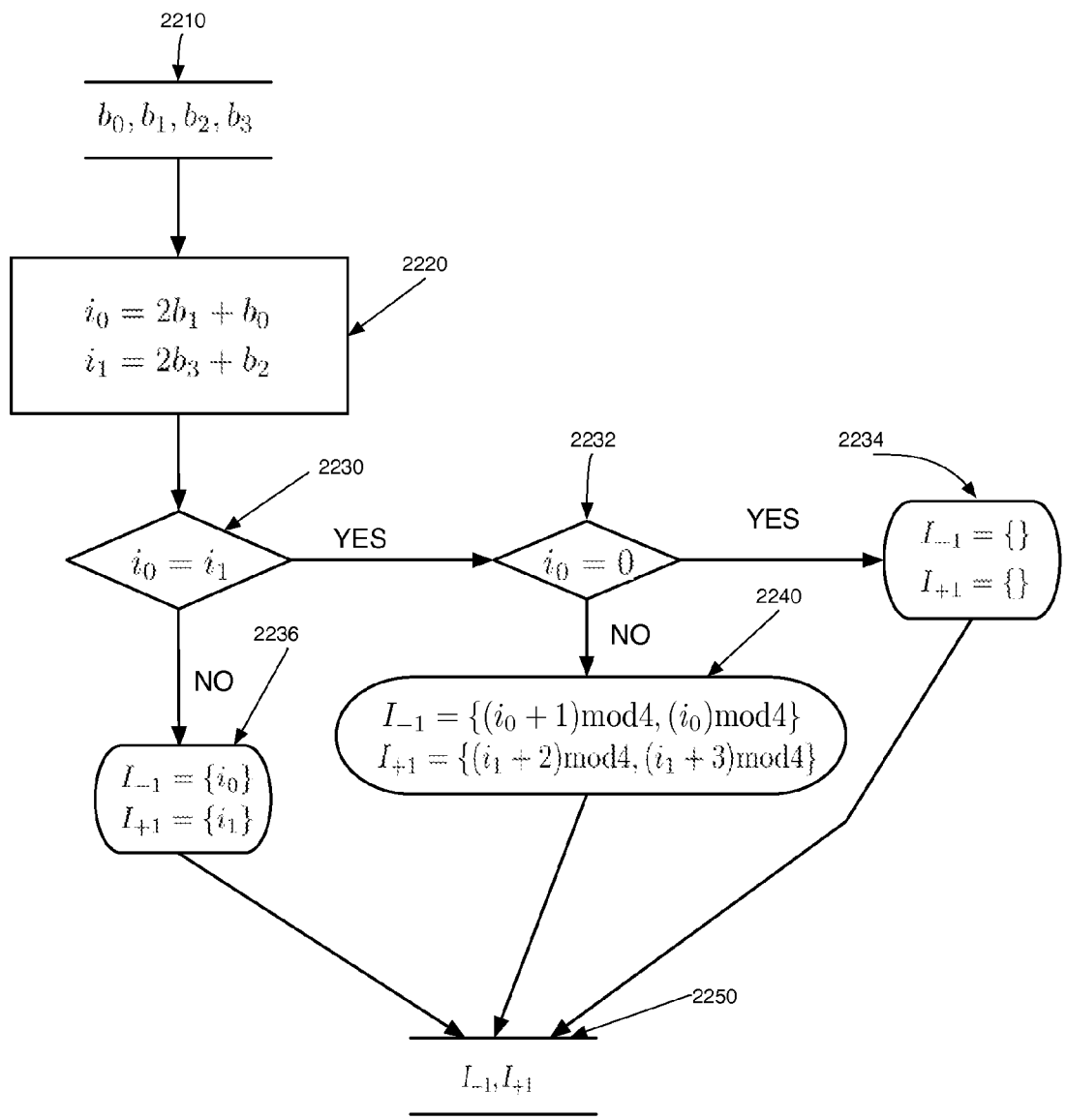
FIG. 22 is a flow chart of an encoding process for a sparse array code in accordance with at least one embodiment.

In some cases, the use of a LUT may be too complex and the encoding architecture of FIG. 21 may be employed. In an embodiment where this is the case, a process is used with which the index generator 2120 generates the indices. Such a process is now further described with reference to FIG. 22 for the sparse array code of Table 1. The input 2210 of the process is the sequence of bits b0, . . . , b3. The output 2250 of the encoding process comprises two sets I−1 and I+1. The set I−1 and I+1 contain indices corresponding to the positions of the −1s and 1s, respectively, of the encoded word c. The remaining indices of the code word are set to 0. Here it should be understood that the positions of c are labeled starting from a 0. In step 2220, two indices i0, i1 are generated. The index i0 is set to the decimal representation of b0, b1 and i1 is set to the decimal representation of b2, b3. In step 2230, the indices i0 and i1 are compared. When i0=i1, step 2232 is performed, where i0 is compared with 0. If i0 is equal to 0, both I−1 and I+1 are set to the empty set in step 2234. If i0 is not equal to 0, I−1 and I+1 are set according to step 2240. Back at step 2230, if i0 is not equal to i1, I−1 and I+1 are set according to step 2236. As an example, consider the case when the bits b3, b2, b1, b0 are given by 0, 1, 0, 1. In this case, i0 equals 2, and the process of FIG. 22 outputs the two sets I−1={2,3} and I+1={0,1}. The corresponding encoded vector is given by c=[1, 1, −1, −1].

One advantage of balanced low-weight ternary codes is that they lead to a low transmitter power consumption, as the most common code word element '0' can be represented by the driver as no inductor current flow, thus no driver power consumption for that element. The described processes may be extended to code words of different lengths, and code words incorporating symbols of fewer or greater number of levels.

Sparse Signaling Codes

In some cases, it may be desirable that the sum of absolute values of every code word of the sparse array code is constant.

This may, for instance, be the case when switching noise has to be limited. Sparse signaling codes are disclosed in Cronie III and satisfy this property. In some embodiments, the sparse array code used by the encoder 720 may be a sparse signaling code of length n. In an embodiment, the encoder 720 maps a sequence of k bits to n real numbers represented by a vector c of size n where the vector c is an element of a predetermined signal constellation S. The signal constellation S may contain at least $2^k$ elements wherein each element has the property that it is a permutation of a vector $x_0$. The vector $x_0$ is called the basis vector of the signal constellation and the signal constellation defines a permutation modulation code. In an embodiment, the vector $x_0$ is defined by a sequence of m integers shown in Equation 5.

$$l0 \leq l1 \ldots \leq lm-1 \quad \text{(Eqn. 5)}$$

For purposes of presentation, we choose to denote by N the sum of the li as in Equation 6.

$$N = \sum_{i=0}^{m-1} l_i \quad \text{(Eqn. 6)}$$

The basis vector x0 has the form shown in Equation 7 where a0 to am−1 are non-zero numbers such that Equation 8 is satisfied.

$$x_0 = \left( \underbrace{a_0, \ldots, a_0}_{l_0} | \underbrace{a_1, \ldots, a_1}_{l_1} | \ldots | \underbrace{a_{m-1}, \ldots, a_{m-1}}_{l_{m-1}} | \underbrace{0, \ldots, 0}_{n-N} \right) \quad \text{(Eqn. 7)}$$

$$\sum_{i=0}^{m-1} l_i a_i = 0 \quad \text{(Eqn. 8)}$$

The vector $x_0$ is sparse, which means that for the purpose of this disclosure $$\frac{n-N}{n} \geq \frac{1}{3}.$$

Since $x_0$ is sparse and Equation 8 holds, it can be concluded that m>1 and $x_0$ has at least three different coordinates. For a sparse vector $x_0$, the code defined by the signal constellation S is called a sparse signaling code. The elements of the sparse signaling code are called code words. Table 3 gives several examples of basis vectors that define sparse signaling codes. Table 3 also lists the pin-efficiency r and the base 2 logarithm of the total number of permutations.

TABLE 3

| n | $x_0$ | r | $\log_2 |S|$ |
|---|---|---|---|
| 4 | [−1,1,0,0] | 0.90 | 3.59 |
| 5 | [−1,1,0,0,0] | 0.86 | 4.32 |
| 6 | [−1,10,0,0,0] | 0.82 | 4.91 |
| 6 | [−1,−1,1,1,0,0] | 1.08 | 6.49 |
| 8 | [−1,−1,1,1,0,0,0,0] | 1.09 | 8.71 |
| 8 | [−2,−1,1,2,0,0,0,0] | 1.34 | 10.71 |
| 9 | [−1,1,0,0,0,0,0,0,0] | 0.69 | 6.17 |
| 10 | [−2,−1,1,2,0,0,0,0,0,0] | 1.23 | 12.30 |
| 12 | [−2,−1,1,2,0,0,0,0,0,0,0,0] | 1.13 | 13.54 |

TABLE 3-continued

| n | $x_0$ | r | $\log_2 |S|$ |
|---|---|---|---|
| 16 | [−1,−1,−1,1,1,1,0,0,0,0,0,0,0,0,0,0] | 1.08 | 17.29 |
| 17 | [−1,1,0,0,0,0,0,0,0,0,0,0,0,0,0,0,0] | 0.48 | 8.09 |

In case m=2, the sparse signaling code is a ternary sparse signaling code. A ternary sparse signaling code is a special case of a balanced low-weight ternary code, as one of ordinary skill in the art will recognize.

In an embodiment, the encoder 720 may employ the architecture of FIG. 21 to implement an encoder for a sparse signaling code. An example of a sparse signaling code that may be implemented by the encoder 720 is the 4b5w code. The 4b5w is defined by a basis vector $x_0$ that has the form shown in Equation 9.

$$x_0 = [-1\ 1\ 0\ 0\ 0] \quad \text{(Eqn. 9)}$$

Figure 23:
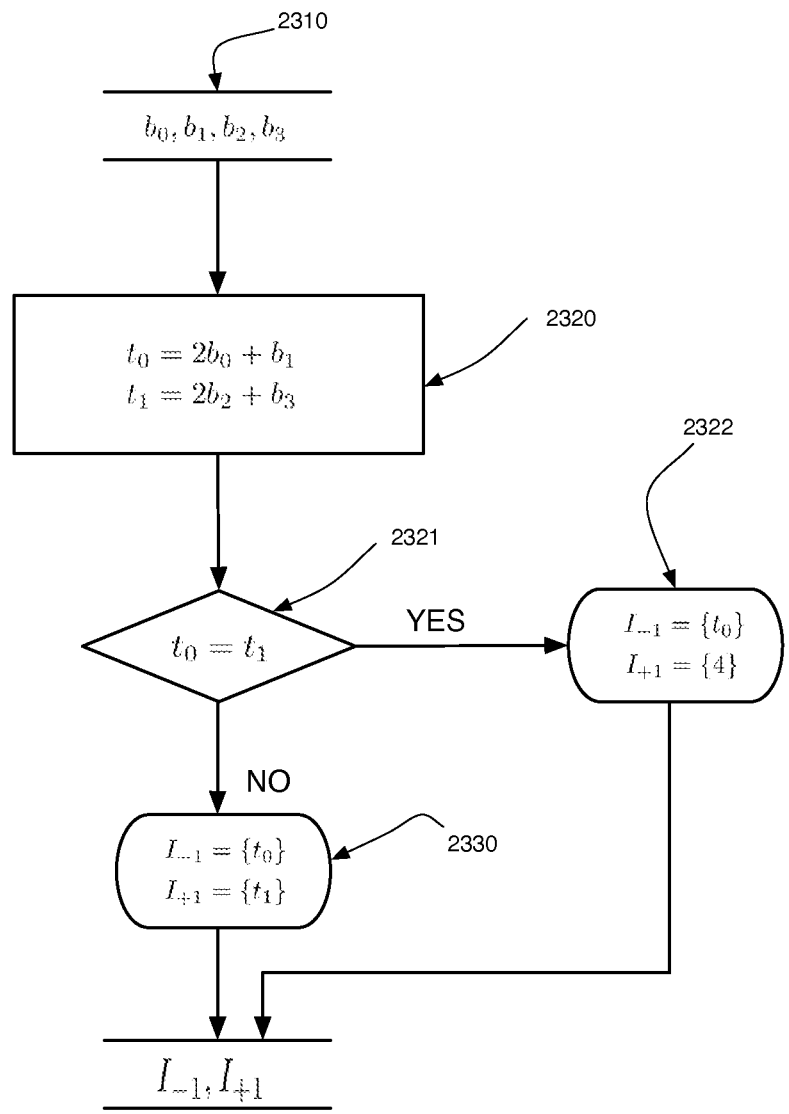
FIG. 23 is a flow chart of a process suitable for an index generator.

There exist 20 distinct permutations of $x_0$ and the 4b5w code consists of 16 distinct permutations. This allows four bits to be encoded into a code word. In an embodiment, a simple encoding process is used by the encoder 720 to map four bits $b_0, \ldots b_3$ to a permutation of $x_0$. For this purpose, the encoder architecture exemplified in FIG. 21 may be used. A process that may be used by the index generator 2120 to generate indices for the non-zero positions in storage unit 2130 is now described with reference to FIG. 23. The input 2310 to the process shown in FIG. 23 are the bits $b_0, \ldots, b_3$. The output of the process is two sets I−1, I+1.

The set I−1 contains the index of the −1 corresponding to permutation representing the input bits b0, . . . , b3. The set I+1 contains the index of the +1 corresponding to permutation representing the input bits b0, . . . , b3. In Step 2320, two indices t0 and t1 are formed by converting the two pairs of bits to their decimal representation. In Step 2321, the indices t0 and t1 are compared. In case t0 is equal to t1, the sets I−1, I+1 are set according to step 2322. In case t0 is not equal to t1, the sets I−1, I+1 are set according to step 2330.

The 8b8w code described in Cronie III is another example of a balanced low-weight sparse signaling code, in this case of length 8 and also based on ternary signals. It should be readily apparent that balanced low-weight codes may also be created that use code words of other lengths and/or are based upon symbols of fewer or greater number of levels.

It should also be apparent that the code word sets of two or more low-weight sparse signaling codes derived from different basis vectors may be combined, with this union of code word sets also comprising a valid low-weight sparse signaling code, the combined code being balanced if each of its component sub-codes are balanced.

Transition-Limited Codes

Because the signal received in an inductively coupled system is proportional to the differential of the transmit signal current, transmit signal transitions appear as receive pulses, and transmit signal pulses as receive double pulses, as illustrated in FIG. 20. As one example, this may lead encoding methods that allow ternary transitions directly between +1 and −1, (or equivalent multi-step transitions of a higher-order symbol) to be difficult to receive accurately. With such encoding methods, the receiver front-end must identify not only the polarity but also the magnitude of change in the original transmit current so that the receive signal corresponding, for example, to a transmitted "0" to "+1" transition may be distinguished from that of a "−1" to "+1" transition.

The overall system complexity may be reduced by and communications performance improved by limiting the generation of such transitions. This introduces a temporal aspect to signaling, wherein the symbol sent in the present period not only depends on the information bits to be sent in this present period but also may depend on what symbols were sent in previous periods. In some instances, this can also reduce the overall number of transitions of signal values. The temporal aspect can be applied to vector signaling methods using binary and non-binary signals. It may also be applied to force a minimum number of transitions on wires within a given interval of time to, as an example, simplify clock extraction from the signal stream.

Transition limited coding" or "TLC" is used herein to refer to vector signaling wherein transitions are constrained as indicated above. Where the certain distance that represents the threshold, i.e., the maximum distance between i and j is at most l, this is referred to as l-TLC encoding. Thus, a ternary vector signaling code constrained to eliminate two-step transitions may be described as a 1-TLC code.

Finite-State Encoders

One embodiment of a TLC encoder incorporates storage of state memory derived from past encoder behavior to provide temporal history. As this state memory and its finite set of allowable transitions over time represents a Finite State Machine, the resulting TLC encoder may be termed a Finite-State encoder.

Figure 33:
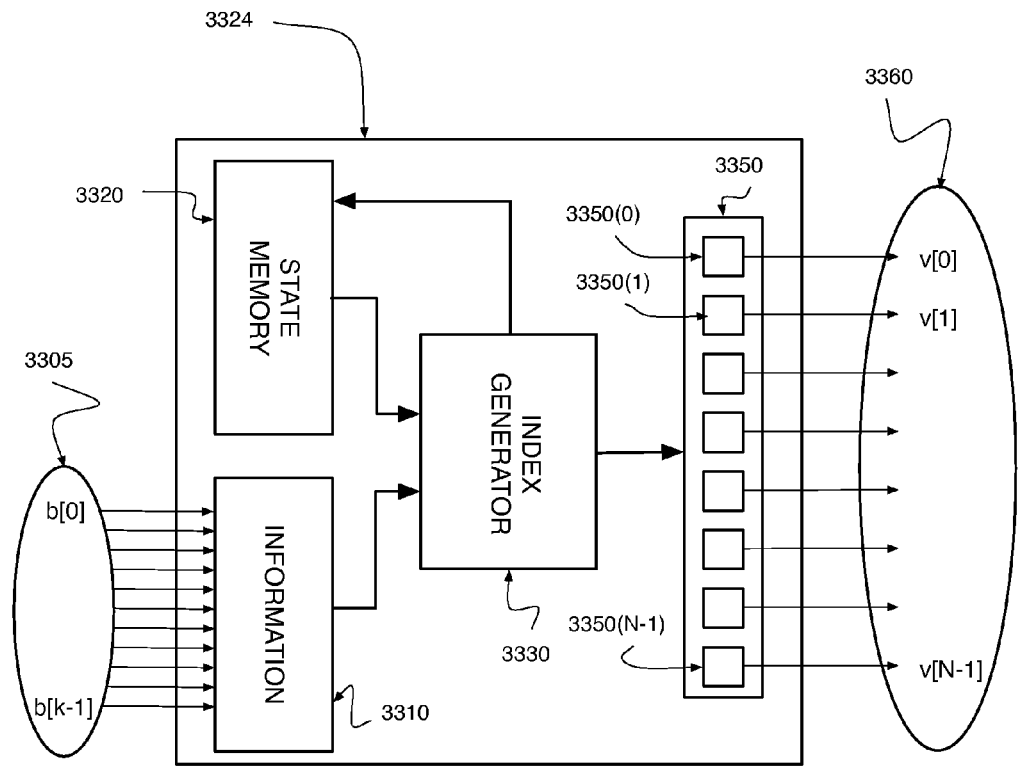
FIG. 33 is a block diagram of a transition-limited encoder.

FIG. 33 illustrates an example embodiment of finite state encoder 3324, comprising an input for bits b[0], . . . , b[k-1] collectively denoted as 3305, an information unit 3310, an index generator 3330, a state memory unit 3320, and additional memory units 3350. Information unit 33100 is coupled to input 3305, as well as index generator 3330, which is in turn coupled to state memory unit 3320 and additional memory units 3350. Additional memory units 3350 are coupled to encoder outputs 3360 referenced as v[0], . . . , v[N−1].

Information unit 3310 receives bits b[0], . . . , b[k-1] and forwards them to index generator 3330. Index generator 3330 calculates additional information based on these bits and based on information it receives from state memory unit 3320.

The additional information computed by index generator 3330 depends on the particular vector signaling code used. For example, where a sparse signaling code as defined in Cronie II or Cronie III is used, index generator 3330 may compute the positions of the nonzero coordinates of a codeword of the code, together with the values or an indication of these values. The information produced by index generator 3330 is forwarded to additional memory unit 3350, which then produces values v[0], . . . , v[N−1] collectively denoted by 3360, which is forwarded to bus driver (as in 1732 of FIG. 19) for transmission.

In some embodiments, there might be substantially fewer values v[i] used than there are wires, i.e., if there are N inductors coupling the integrated circuit devices, fewer than N v[ ] values might be in use.

One task of state memory unit 3320 is to keep a partial history of the codewords of the vector signaling code that have been transmitted in the past, or an indication of such partial history, which will enable index generator 3330 to produce the next codeword based on this information (and the bits 3305). It therefore provides a temporal correlation between successive codewords sent by communication system 500 so as to ameliorate the reliability of the received signals as discussed above. Details of specific operations of state memory unit 3320 and how its state is used by index generator 3330 can depend on the particular application, as described in Cronie IV.

Advantages of Signaling on Coupled Inductor Arrays and Sparse Array Codes

The use of coupled inductor arrays that comprise three or more legs in combination with sparse array codes provides a power advantage over conventional inductive coupling, as such coupled inductor arrays may allow for a reuse of current that drives the array.

Figure 24:
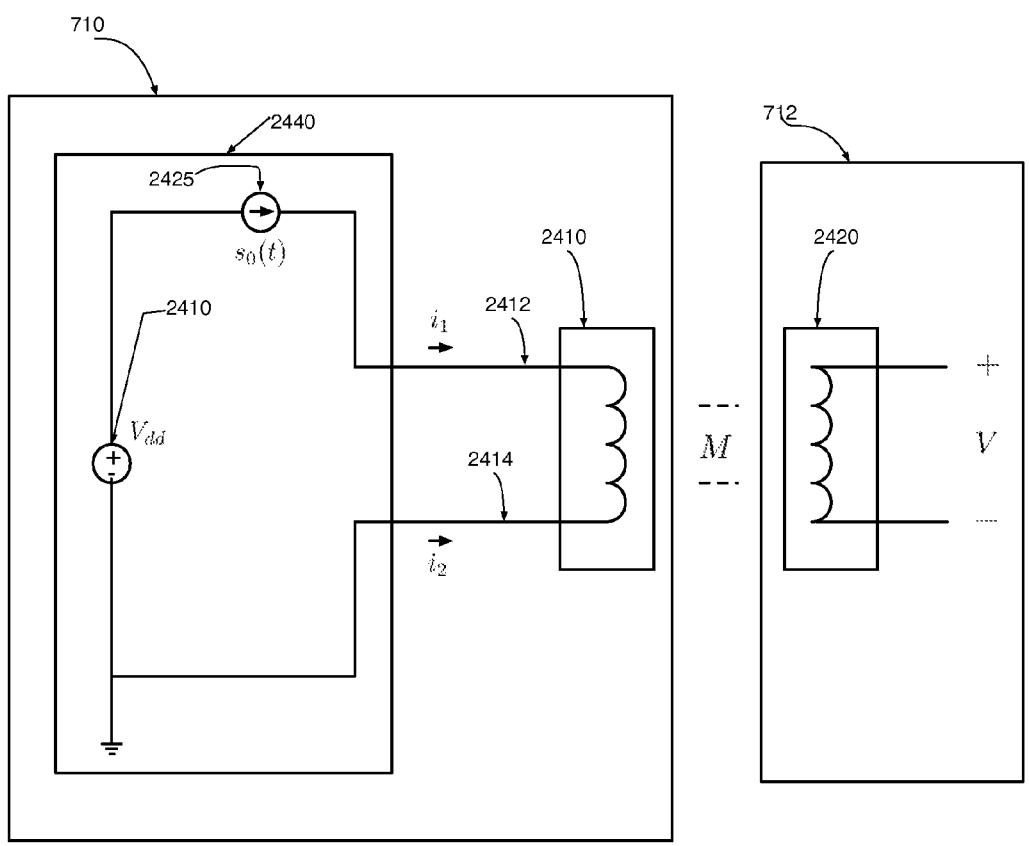
FIG. 24 illustrates an inductive chip-to-chip communications system using a Type I inductor array.
Figure 25:
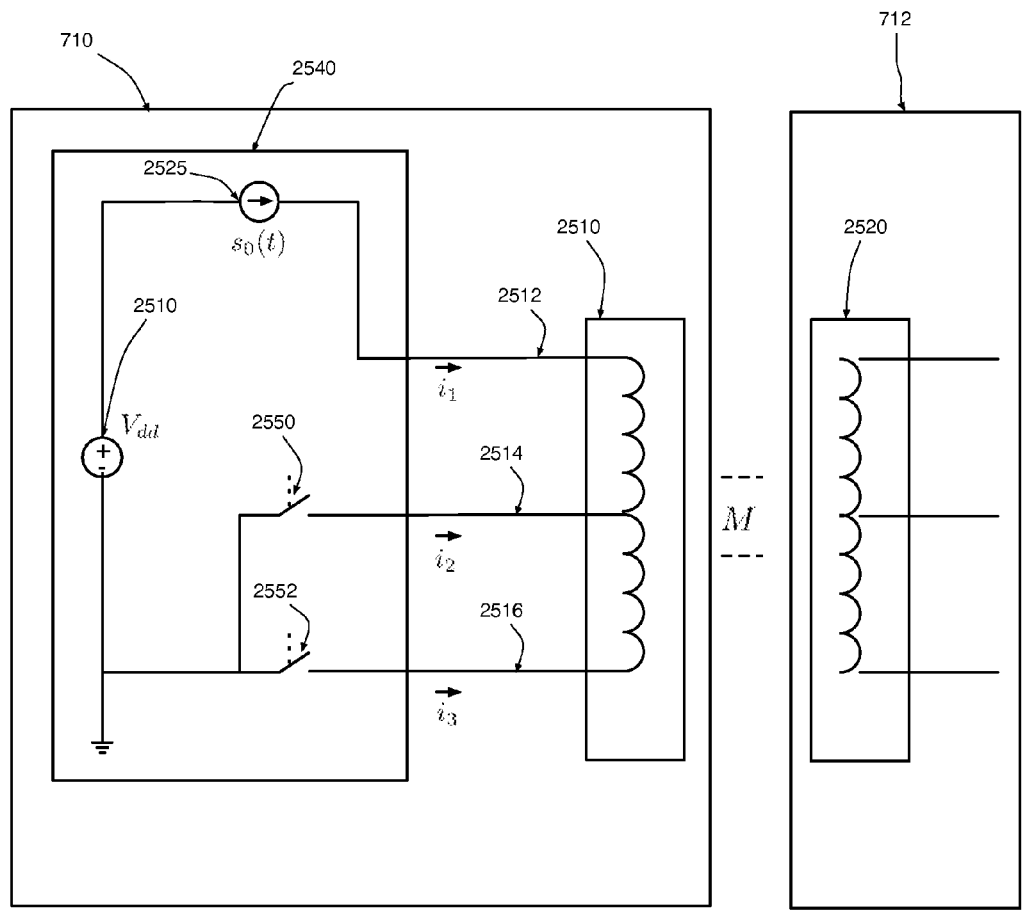
FIG. 25 illustrates an inductive chip-to-chip communications system using a Type II inductor array.

FIG. 24 illustrates this, showing a conventional inductive chip-to-chip communication system. The system of FIG. 24 comprises a chip 710 that communicates with a chip 712. In the setting of FIG. 25, chip 710 is transmitting information and chip 712 is receiving the information. Chip 710 comprises an inductor 2410 with two input legs 2412 and 2414 that is coupled to an inductor 2420.

A change in current through inductor 2410 leads to a voltage V that is developed across the legs of inductor 2420. The inductor 2410 at the transmitter side is driven by a general purpose driver 2440 that may implement many signaling methods as known to those of skill in the art. The general-purpose driver 2440 comprises a voltage source 2410 that supplies a fixed voltage of Vdd Volts. The voltage source 2410 supplies the energy of the driver circuitry. The driver 2440 comprises a controlled current source 2425 that generates a current s0(t) that is modulated according to the data transmitted.

Many such methods are known to one of skill in the art. The current source 2425 sources into leg 2412 of the inductor 2410. In FIG. 24, the current in leg 2412 is denoted by i1 and is equal to s0(t) and the current in leg 2414 is denoted by i2. Furthermore, these two currents are related by i1=−i2 since leg 2414 is the return path of current i1.

A disadvantage of using a single inductor 2410 with two legs (or more generally, inductor arrays of Type I) is that there is only one available degree of freedom to transmit an information-carrying signal. Once the current is defined on one of the legs 2412, 2414 of an inductor, the other leg has to serve as a return current path.

The situation is different for Type II and Type III inductor arrays, as may be seen in FIG. 25, which shows a chip-to-chip communication system based on a Type II inductor array. There, a first chip 710 communicates with a second chip 712 and the communication takes place through inductor array 2510 and 2520. The inductor array 2510 at the transmitting chip 710 has three legs 2512, 2514 and 2516. The driver 2540 for the array 2910 comprises a voltage source 2510 that feeds the driver and a current source 2525. The current source 2525 sources a current of strength s0(t) into leg 2512. The information may be encoded into the signal s0($t$). The current in leg 2512 is denoted by i1 and i1 is proportional to s0(t). The current i1 may either return through leg 2514 or leg 2516. The return path is determined by one of the switches 2550 and 2552. To provide a return path at least one of these switches has to be closed. The choice of return path provides an additional degree of freedom with which information may be encoded without using more driver current. In FIG. 25, this additional information bit may be encoded by simply switching the return path from leg 2514 to 2516. The chip 712 that receives the magnetically coupled information may detect the change of return path and recover the original bit. As one of skill in the art will recognize, the scheme with switches 2550, 2552 in FIG. 25 is an example of a sparse array code. The fact that the sum of i1, i2 and i3 is equal to 0 corresponds to the condition of Equation 3. Furthermore, in case s0(t) is chosen as a constant current of I for the duration of a communication interval and one of the switches 2550, 2552 is closed, the sparse array code is a ternary sparse array code with code words (I, 0, −I) and (I, −I, 0).

Figure 26:
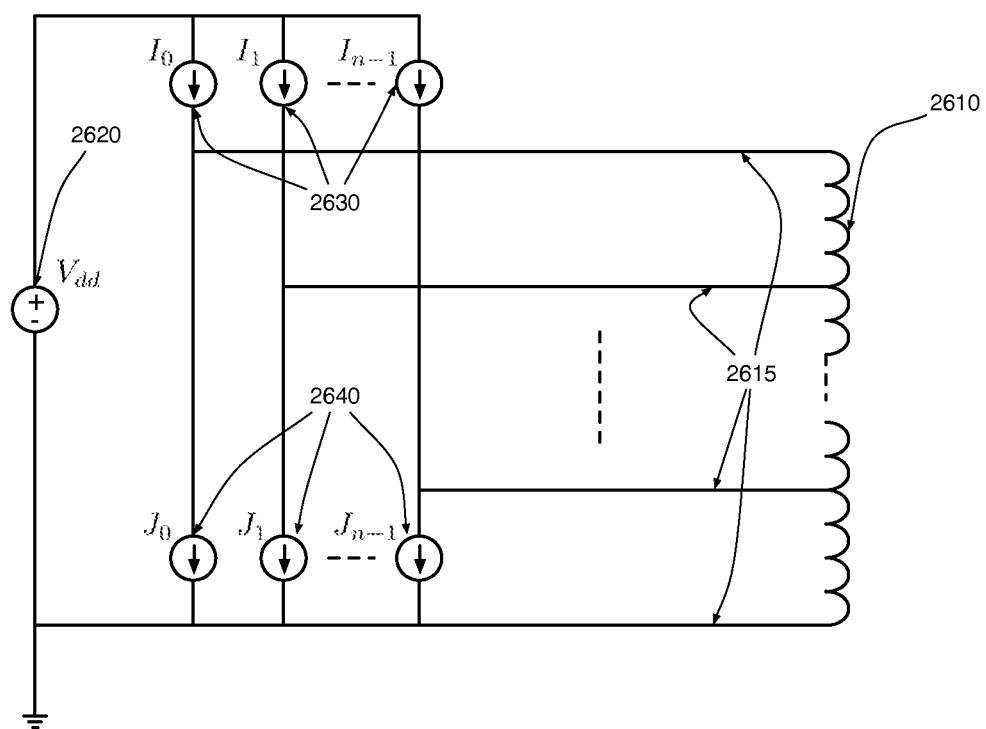
FIG. 26 is a model of a driver for a Type II inductor array in accordance with at least one embodiment.

To illustrate the power efficiency of general sparse array codes, a general-purpose model of a driver for Type II inductor arrays is shown in FIG. 26. The energy source of the driver is the voltage source 2620. The voltage source 2620 supplies a voltage equal to Vdd. The driver comprises current sources 2630, 2640 that drive an inductor array 3010. The inductor array has n legs 2615. Each of the current sources 2630 sources a current of strength Ii into the ith leg inductor array 2610 and each of the current sources 2640 sinks a current of strength Ji from the ith leg of inductor array 2610. The numbers I0, ..., In−1 and J0, ..., Jn−1 define the current sources 2630 and 2640. Furthermore, they are larger than zero and satisfy Equation 10.

$$\sum_{i=0}^{n-1} I_i = \sum_{i=0}^{n-1} J_i \qquad \text{(Eqn. 10)}$$

The constraint of Equation 10 makes sure that the sum of currents sourced into the legs 2615 of the inductor array 2610 equals the sum of currents sunk from the legs 2615 of the inductor array 2610.

When input of the communication bus is generated by a vector (z0, ..., zn−1), the numbers I0, ..., In−1 and J0, ..., Jn−1 that define the current sources 2630 and 2640 are given by Equation 11 and Equation 12, respectively.

$$I_i = \frac{|z_i| + z_i}{2} \qquad \text{(Eqn. 11)}$$

$$J_i = \frac{|z_i| - z_i}{2} \qquad \text{(Eqn. 12)}$$

The energy for driving the bus wires is supplied by the voltage source 2620 and the instantaneous power consumed, denoted by P(t), may be written as shown by Equation 13.

$$P(t) = Vdd \cdot p(t) \cdot \left( \sum_{i=0}^{n-1} I_i + \sum_{i=0}^{n-1} J_i \right) = Vdd \cdot p(t) \cdot \frac{\|z\|_1}{2} \qquad \text{(Eqn. 13)}$$

In Equation 13, $\|z\|$ denotes the L1-norm of z. In a chip-to-chip communication system, Vdd and p(t) may be fixed and the power consumption determined by $\|z\|_1$. In comparing different chip-to-chip communication schemes, one may assume that Vdd is equal to one and p(t) is a constant function that has value one.

Driver Architectures

Figure 1:
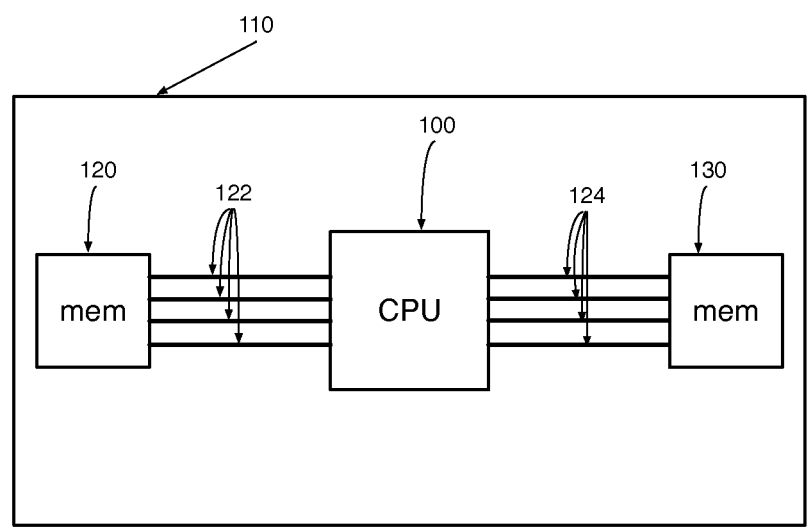
FIG. 1 illustrates an example of a prior art interconnection of components using a printed circuit board.
Figure 2:
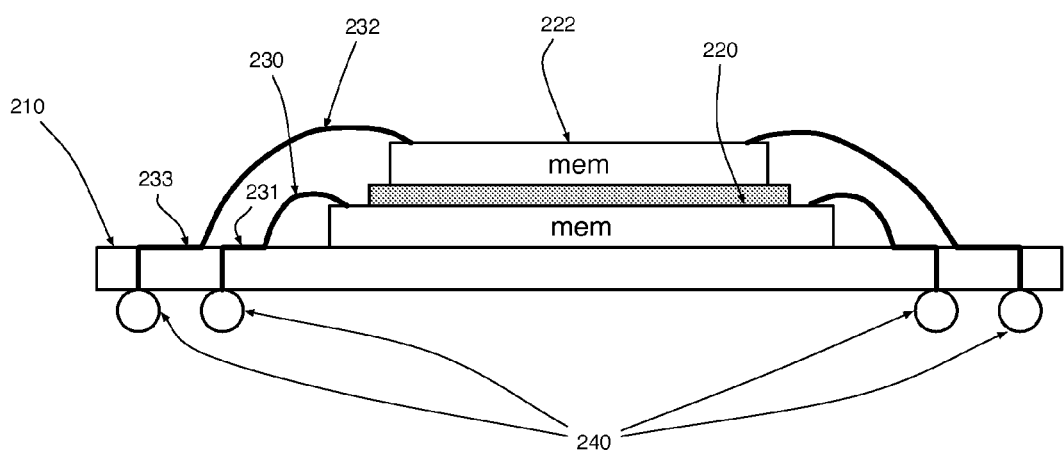
FIG. 2 shows an example of prior art multichip packaging.
Figure 3:
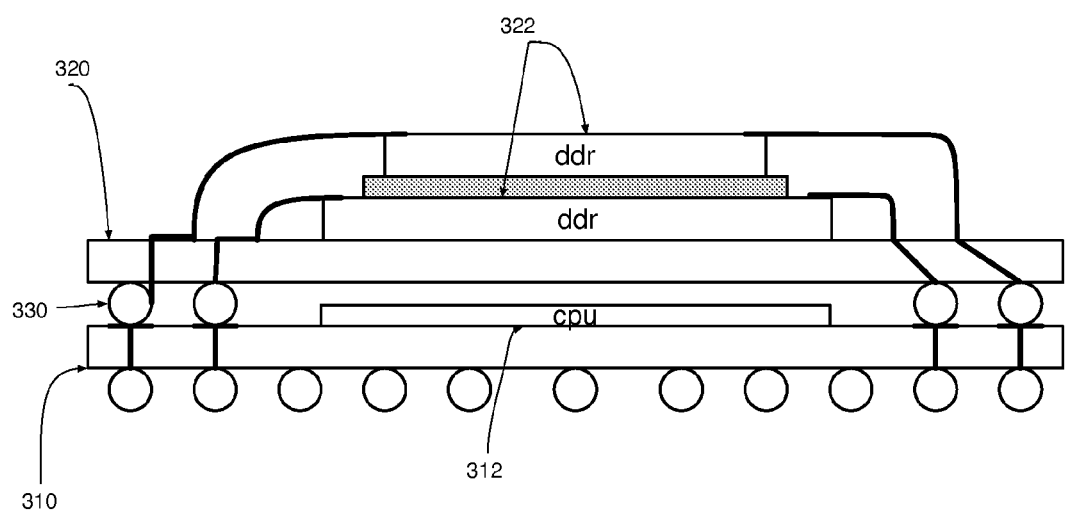
FIG. 3 shows another example of prior art multichip packaging.
Figure 4:
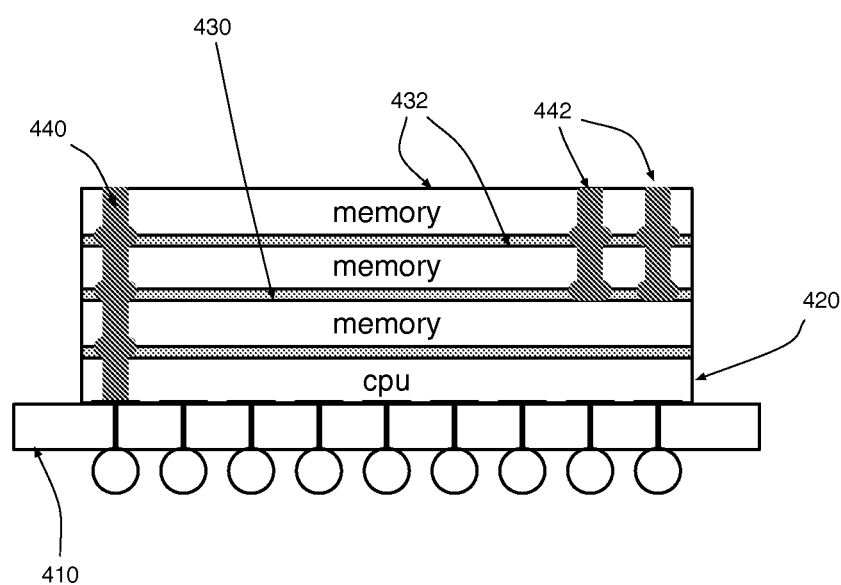
FIG. 4 shows an example of prior art multichip stacking using through-silicon vias.
Figure 5:
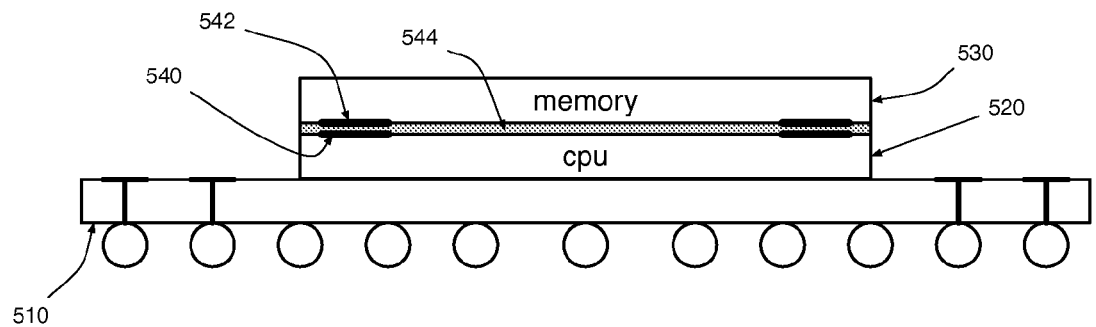
FIG. 5 shows an example of prior art multichip stacking using capacitive coupling.
Figure 6:
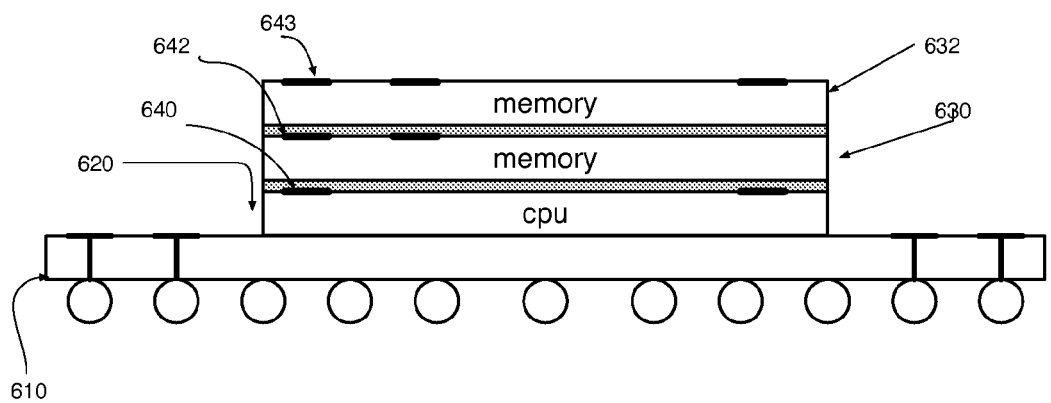
FIG. 6 shows an example of prior art multichip stacking using inductive coupling.

Circuits for driving a single inductor with a controlled current are well known in the art, and are directly applicable to Type I inductor configurations as shown in FIG. 9. If the polarity of the inductor current is required to change rather than merely the amplitude (such as with a ternary code comprised of +1, 0, −1 levels,) a conventional approach uses a H-bridge driver configuration (as an example, in Kuroda I FIG. 2.) In a H-bridge, each leg of the inductor is independently driven by a push-pull driver element, thus allowing current to be driven through the inductor in either direction, or not at all. In some embodiments, a half-bridge configuration may be used with the inductor connected between a single push-pull driver element and an intermediate voltage; this intermediate voltage may include ground, if the driver is capable of outputting both positive and negative voltages.

An AC-coupled half-bridge variation is also known in the art (as an example, in Miura I FIG. 9) where DC current flow to the intermediate voltage is suppressed by use of a series capacitor, thus reducing driver power consumption. However, the required value for such a series capacitor is difficult to incorporate within an integrated circuit design.

Type II inductor configurations as in FIG. 10 facilitate current-steering driver topologies. In these topologies, current flow through an array of inductors is controlled by a series of electronic switches. Thus, such configurations may be described as steering the path of a fixed current through selected inductor array elements, rather than enabling current in one element and disabling current in another. Because current sourced into one inductor array element will pass through each intermediary inductor array element to reach a current sink, the current through each inductor (representing a code word symbol) is controlled by the difference between its terminal's driver levels.

At the system level, the encoding method employed preferably takes into account this topological restriction on current flow within the inductor array, so that code words representing unachievable current flow patterns are not generated. In some cases, drivers having sets of transistors scaled to sink or source different current levels may be used to loosen such constraints. As an example, a current flow pattern representing the sequence of code word elements of Equation 14 cannot be achieved in a Type II inductor array with drivers capable of producing only a single sink or source current level per terminal, but can be achieved with drivers capable of producing two distinct current level per terminal.

$$+1 \ 0 \ +1 \ -1 \ -1 \qquad \text{(Eqn. 14)}$$

Figure 28:
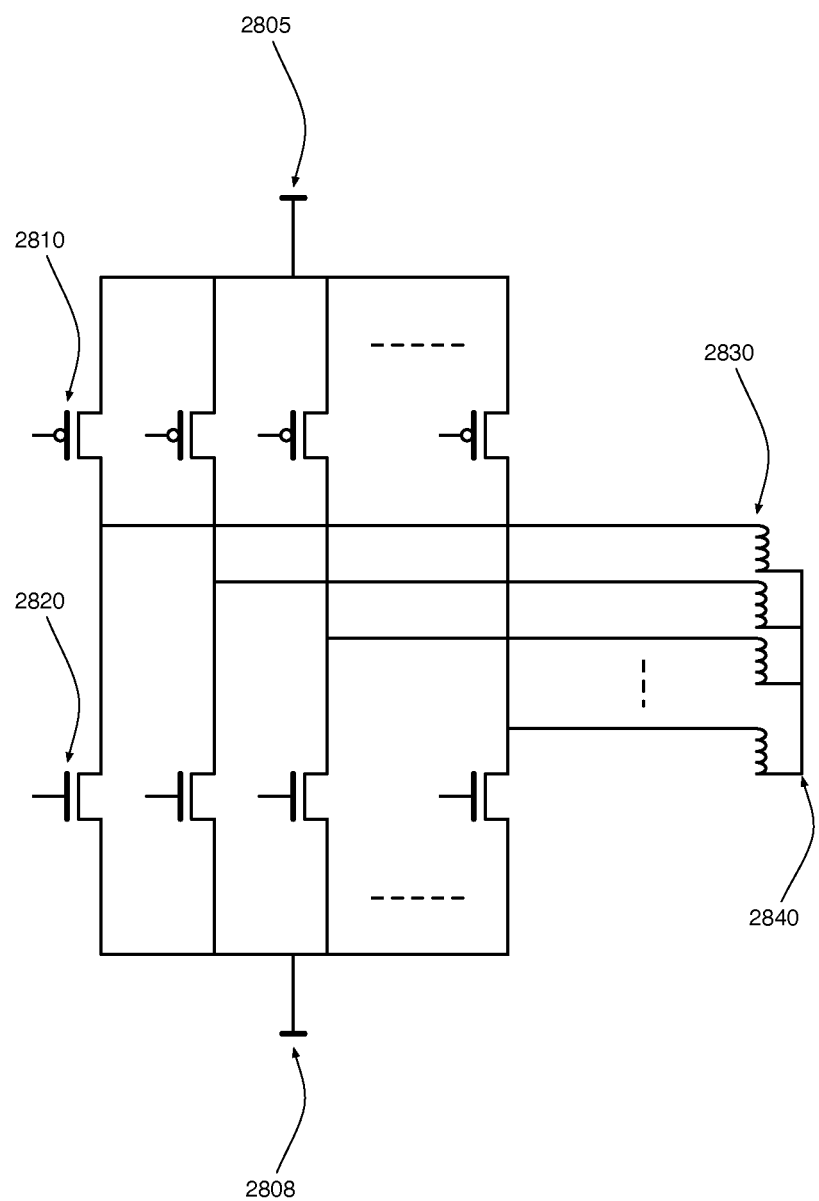
FIG. 28 is a schematic of a driver for a Type III inductor array in accordance with at least one embodiment.

Type III inductor configurations as shown in FIGS. 11 and 12 may also be used in current-steering driver topologies, and are particularly well suited for use with ternary balanced codes. If current flow into the independent terminal of an inductor in a Type III array is considered to represent a '+1' code word element, and current flow out of the independent terminal a '−1' code word element, the driver configuration in one embodiment becomes extremely simple, with each inductor's independent terminal driven by a push-pull transistor configuration as in FIG. 28 that can source, sink, or provide no current to that terminal, representing positive, negative, and zero code word elements of the ternary code word.

As an example, inductive array element 2830 is driven to a '+1' value by enabling source transistor 2810, by a '−1' value by enabling sink transistor 2820, and to a '0' value if neither 2810 nor 2920 is enabled. Current flow through each inductor from positive supply voltage 2805 and negative supply voltage 2808 (which may be ground) is controlled by the physical characteristics of each source or sink transistor (as in 2810 and 2820.) Additional examples of such source or sink transistors can be found in Cronie III and Tajalli I.

Figure 29:
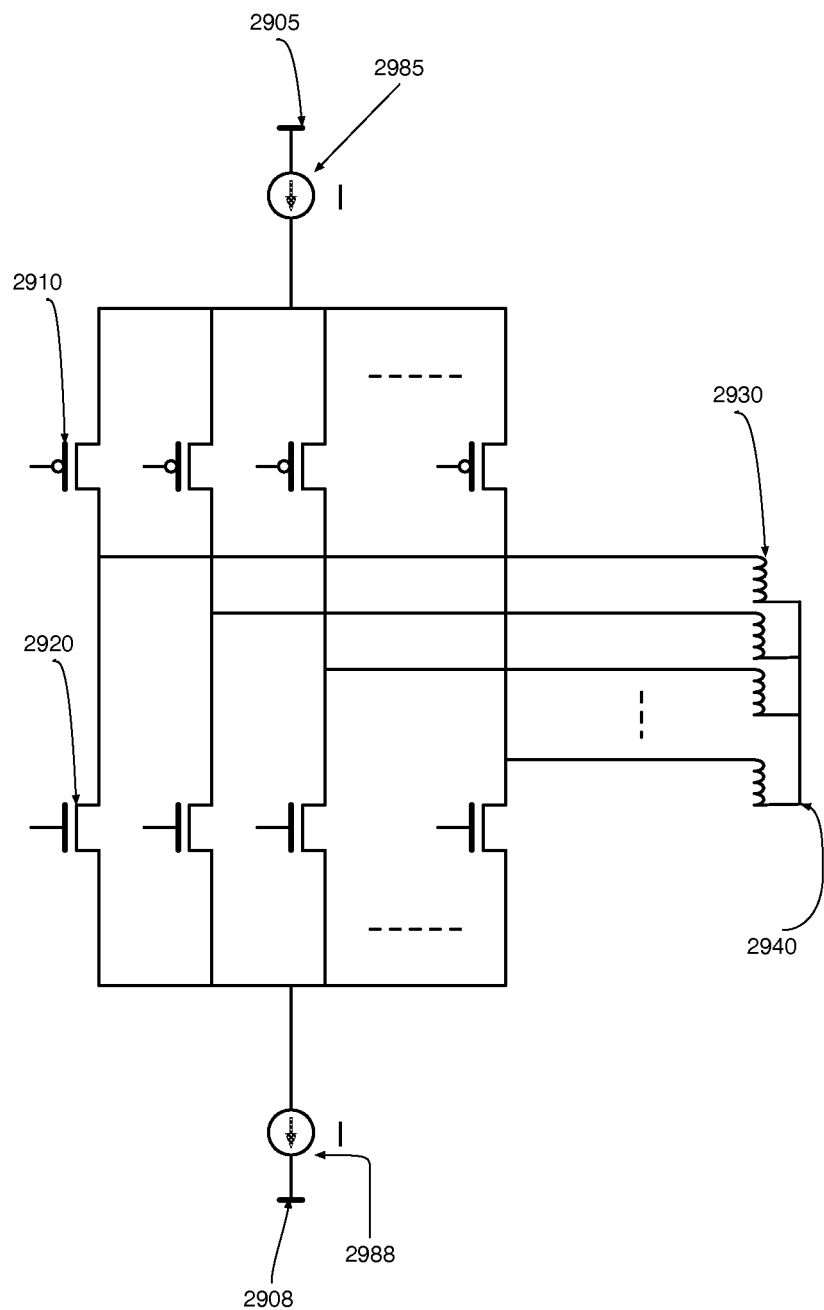
FIG. 29 is a schematic of a driver for a Type III inductor array in accordance with at least one embodiment.

In another embodiment, illustrated in FIG. 29, the positive supply voltage 2905 and negative supply voltage 2908 (which may be ground) are provided via current sources 2985 and 2988, which are set to constrain the total current to be sourced and sunk by each code word. For many vector signaling codes, the total source and sink current required (that is, the total number of +1 and −1 symbols in each code word) will be constant over the set of all possible code words. In such embodiments, the constrained source/sink current may be described as being steered by the driver transistors to the appropriate inductor elements.

Balanced codes have an equal number of positive and negative values in the code word (that is, in the aggregate of signals driving the inductor array,) allowing the common inductor terminal 2840 or 2940 to be left floating, eliminating the need for split driver power supplies or an intermediate voltage source in at least one embodiment.

Such Type III inductor array driver configurations can be easily extended to support balanced codes comprised of code words incorporating code word elements having fewer or greater number of levels than the three levels considered in the present example. As a further example, one embodiment replaces the two transistors in the push-pull output stage of each inductor array driver with two pairs of transistors scaled in size so as to provide different currents, facilitating use with balanced codes utilizing, as examples, five or seven distinct element levels.

Receiver Front-End Architectures

A single integrated inductor array may be used for transmission, reception, or both operations sequentially. Without loss of generality, the following descriptions assume that a particular inductor array or set of inductors within an array is used only for transmission or only for reception. If time-sequential transmission and reception using the same inductor elements is desired, an electronic switching function may be utilized to share the inductor elements between transmit driver and receiver front-end circuits.

The processing capabilities required in the front-end receiver are dependent on system environment (noise, inter-chip spacing, transmission data rate) as well as encoding method. Receive signal amplification is often required, and filtering may be required to minimize extraneous noise or to control received pulse shape.

As previously described, encoding with an appropriate transition-limited code (e.g. one constrained to transitions from 0 to +1, 0 to −1, +1 to 0, and −1 to 0 in a ternary code) may allow simplified receiver embodiments which are sensitive only to receive signal polarity rather than polarity and magnitude. Embodiments utilizing return-to-zero pulse waveforms as exemplified by 1860 in FIG. 18 also satisfy this constraint. In such embodiments, the receiver front-end need only identify the absence of a receive signal, the presence of a signal corresponding to a positive-going transition, or the presence of a signal corresponding to a negative-going transition.

Other embodiments may require a true integration of receive pulse amplitude over pulse duration to obtain a sufficiently accurate estimate of transmit current magnitude change. Further embodiments having relatively linear transmit slew rate characteristics may rely on the amplitude or duration of the receive pulse alone as an adequate indication of transmit current magnitude change.

The relative timing of received pulse arrival across multiple channels may vary, depending on small variations in transmit current, transmit signal slew rate, array element inductance, etc. Because of the tight co-planarity of inductors within an integrated circuit structure and the minimal variation of spacing obtained when wafers are stacked, distance variations between transmit and receive inductors are generally not significant contributors to skew.

Significant amounts of inter-channel skew may impact subsequent processing steps, if not addressed either explicitly (signal deskewing or latching) or implicitly (use of decoding methods not sensitive to inter-channel skew.) In particular, uncorrected inter-channel skew may impact analog-to-digital conversion or signal maximum/minimum detection using a voltage-to-time converter. Alternatively, an embodiment matches transmit driver characteristics and inductor values closely enough that the skew between received pulse arrival across multiple channels is less than the minimum pulse width transmitted on any one channel.

Circuits for efficient processing and detection of Balanced Codes are described in Tajalli I. Finite-state decoders for transition-limited codes are described in Cronie IV.

An Example Inductive Communications System

Figure 27:
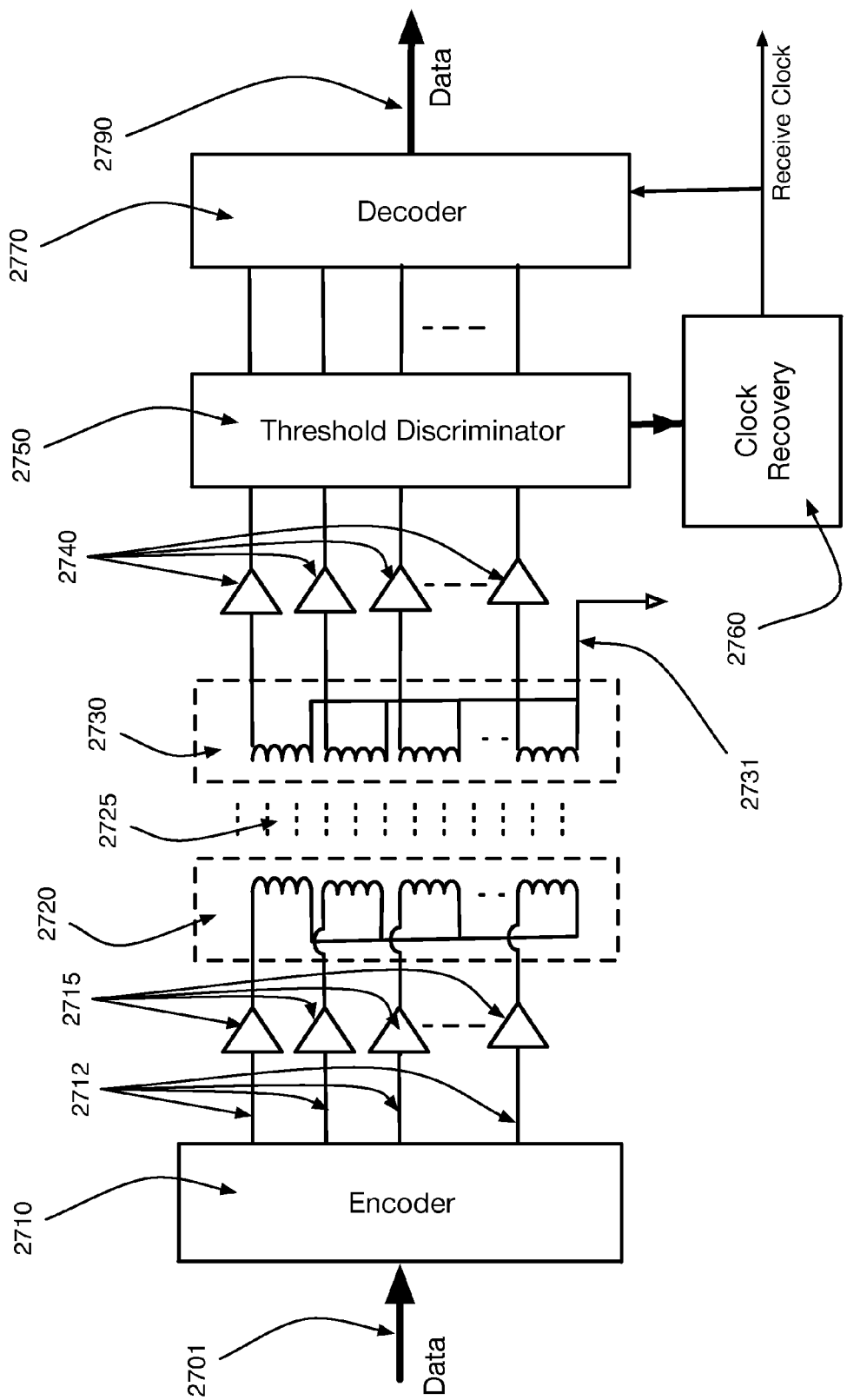
FIG. 27 shows an inductive chip-to-chip communications system using a Type III inductor array.

An example embodiment of an inductive communications system incorporates the previously described elements into a system, as shown in FIG. 27.

For purposes of illustration, one embodiment of a data communications channel transmitting eight bits of data over an eight channel chip-to-chip inductive interfaces is described, although greater and fewer data bits and channels may equally well be utilized. Similarly, without limitation, the 8b8w sparse signaling code of Cronie III is used as an example. This is a balanced three-level code, transmitting information simultaneously on eight inductive elements. Within each symbol transmitted, two elements represent a positive value, two elements represent a negative value, and four elements represent zero values. Symbols are transmitted using RZ coding with a trapezoidal waveform as shown in FIG. 18 waveform 1860, using an array of eight inductors in a Type III configuration and push-pull drivers as illustrated in FIG. 29. Returning all transmit currents to zero during the symbol period further reduces transmit power usage, beyond the savings already obtained from the sparse signaling code, and also insures a sufficient density of received signal transitions, simplifying receive clock recovery. The duration of the transmit waveform "on" time is greater than the worst-case receive skew time across all channels, which also simplifies receive processing.

Referring again to FIG. 27, input data 2701 is mapped by the encoder 2710 into symbols comprising multiple elements 2712 that are converted into distinct current flows in transmit inductor array 2720, here shown as a Type III array, by transmit drivers 2715. Coupling 2725 between the transmit inductor array and an identical array of receive inductors, again shown here in a Type III configuration, induces receive currents that are amplified by receive amplifiers 2740 and converted into received symbol elements by a threshold discriminator 2750. The common terminal 2731 of receive inductor array 2730 may be connected to ground or to a convenient bias source for receive amplifiers 2740.

Figure 30:
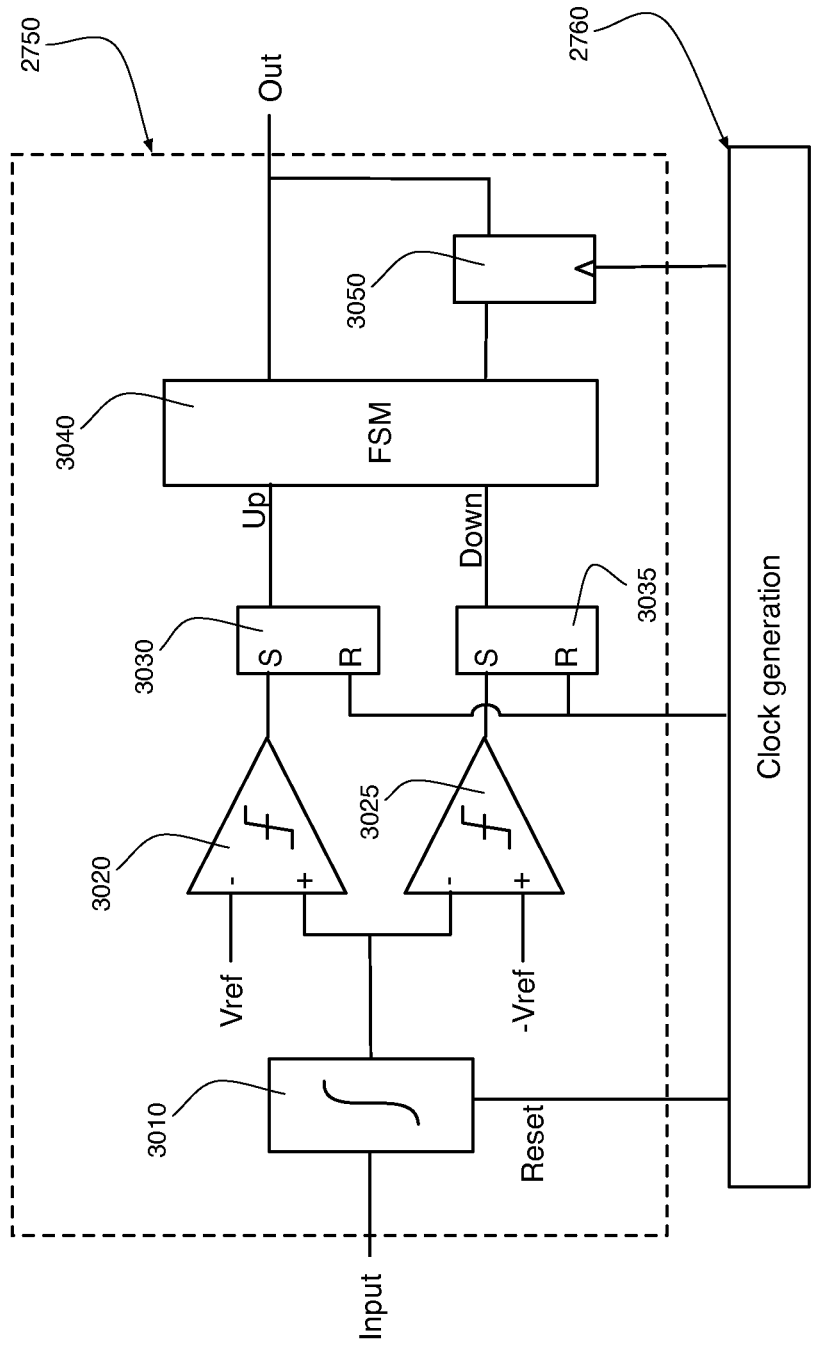
FIG. 30 is a block diagram of one channel of a receive detector for inductively coupled signals.
Figure 32:
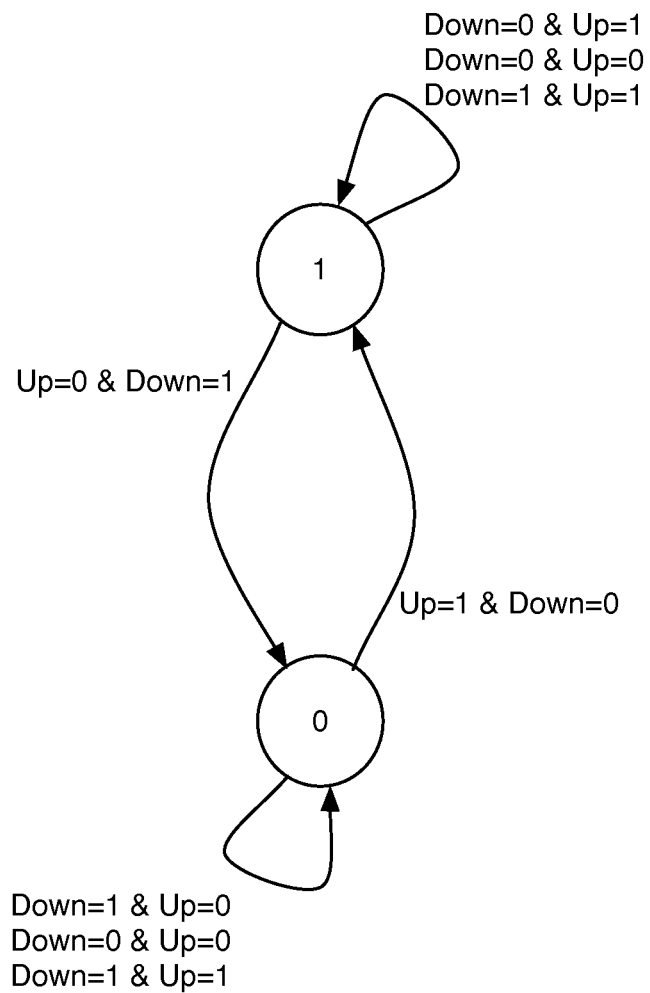
FIG. 32 is a state machine diagram for one embodiment of the detector of FIG. 31.

In one embodiment illustrated in FIG. 30, the threshold discriminator 2750 for each receive channel comprises an integrator 3010 processing signal Input for comparators 3020 and 3035 to identify the receive pulses corresponding to transmitted positive- (3020) and negative-going (3035) signal edges based on a threshold. By appropriate selection of reference levels Vref and −Vref, the threshold is optimally set at a level above that of non-signal-related noise, and below the peak receive signal obtained from signal-related transmit edges. Transmitted signals representing a "+" symbol element will be received as a positive-going pulse at the start of the transmitted unit interval, setting latch 3030. Transmitted signals representing a "−" symbol elements will be received as a negative-going pulse at the start of the transmitted unit interval, setting latch 3035. The threshold discriminator for each channel is further comprised of receive symbol element logic that unambiguously identifies the symbol element transmitted and the start of each symbol transmission. A simple finite state machine 3040 using one bit of state 3050 implements the state machine illustrated in FIG. 32 to produce data Output.

Another embodiment measures actual signal levels of each channel, either as distinct values or as differences between channels, as described in Tajalli I. In such an embodiment, the symbol elements are represented as amplitudes that a sorting decoder may subsequently assign to "+", "−", and "0" roles in the sparse signaling code.

Figure 31:
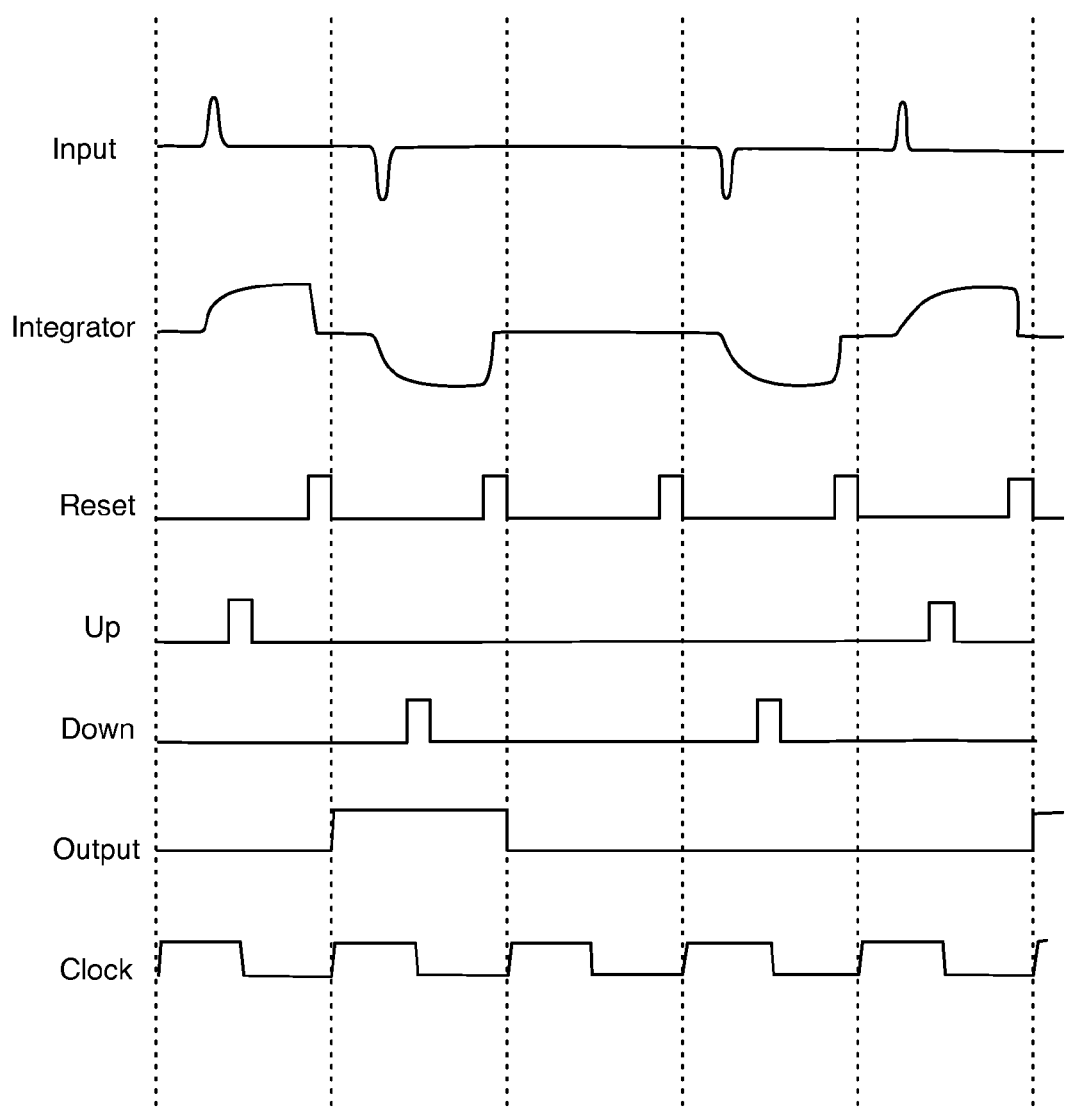
FIG. 31 is a timing diagram illustrating operation of the detector of FIG. 31.

Clock recovery 2760 is also driven by receive channel information. One embodiment uses the logical OR of the received channel signals to identify the start of a received symbol period, with a PLL or DLL driven by that signal subsequently used to sample the received data on latches 3030 and 3035, advance the FSM state 3050, and reset integrator 3010 in preparation for the next received symbol, as illustrated in the timing diagram of FIG. 31.

In other embodiments with moderate symbol rates, fixed delays from reception of input pulses may suffice to perform the equivalent internal timing functions.

Operation of the channel state machines and subsequent clock recovery may also be facilitated by the constrained format of symbols transmitted using the sparse signaling code and a Return-to-Zero symbol waveform. In particular, it is easy to distinguish between a channel in the driven first phase of a RZ transmission period that represents a zero symbol element, and a channel in the un-driven second phase of the RZ transmission period, as only in the former interval will the elements received across all channels correspond to a code word of a properly formed sparse signaling code.

Other mechanisms for clock recovery from serial communications channels are well known in the art, and may equally well be applied.

Returning to the system block diagram of FIG. 27, the received symbol detected at 2750 is decoded 2770 using a method such as described in Tajalli I, reconstructing the original data value as transmitted at 2790.

Additional Coding Variations

Use of Balanced low-weight codes, and in particular Balanced Sparse Signaling Codes has been described, particularly in combination with pulsed transmission waveforms. Other families of codes may also be applicable, including the ODVS codes described in Cronie I.

As has been previously mentioned, some of the self-clocking benefits obtained from pulsed transmission waveforms may also be seen with codes incorporating both symbol-level structure (e.g. the 2, 4, 2 element symbol structure of the example 8b8w balanced ternary sparse signaling code,) and time-order structure, such as the constraint to single-level transitions on any given symbol element of a 1-TLC, and a further constraint that there be at least one symbol element change between consecutive symbol periods to facilitate self-clocking receive operation.

The latter two requirements may be generalized into the coded symbol equivalent of a run-length limit, as that concept is applied to conventional differential transmission channels. As an example, consider a ternary code that maps six data bits into ternary signals on nine transmit channels, cycling among four different working sets of code words in consecutive symbol intervals. (That is, such a code must contain at least 4*(2^6) code words of the appropriate pattern, which may then be partitioned into four working sets each capable of encoding six bits of data.) An embodiment of such a channel-and-time-dimensioned 6b9w4t code is balanced and sparse within every symbol interval, and can guarantee a minimum transition density for clock recovery, single level transitions to simplify receive front-end logic, and a maximum driver on-time while using NRZ transmission.

Extensions

Although described in relation to inductively coupled chip-to-chip communications, the methods described herein are equally applicable to other inter-chip communications media, including without limitation capacitive, optical, and wire connections including integrated circuits incorporating through-hole-vias. With the added considerations described regarding inter-channel skew, the same methods are applicable to communication over longer distances using optical, wire, or wireless media. A number of such examples of specific code use have previously been described in Cronie I, Cronie II, Cronie III, and Cronie IV.

What is claimed is:

1. A method for transmitting information between integrated circuit devices, the method comprising:
   obtaining a plurality of data words comprising a first data message to be transmitted between the integrated circuit devices;
   encoding the first data message into a series of encoded words comprising elements selected from a fixed set of discrete positive, negative, and zero values, such that for each encoded word the sum of all of the values of its elements is zero;
   controlling current flows within a set of integrated circuit inductors, where each inductor current flow represents one element of an encoded word of the series of encoded words.

2. The method of claim 1, further comprising:
   inducing current flows in a second set of integrated circuit inductors;
   interpreting the induced current flows as elements of a receive word, of a series of receive words; and
   decoding and outputting the series of receive words as a second data message.

3. The method of claim 2, wherein each of the set of integrated circuit inductors and the second set of integrated circuit inductors contains at least two inductors.

4. The method of claim 2, wherein interpreting a receive word as an element of a valid sparse balanced code is used as a receive clock signal.

5. The method of claim 1, wherein each encoded word is a code word of a balanced code.

6. The method of claim 5, wherein each encoded word consists of elements selected from a set of values consisting of a single positive value, a single negative value, and zero.

7. The method of claim 5, wherein inductor current flows corresponding to negative values within an encoded word are produced by return current from inductor current flows corresponding to positive values within the encoded word.

8. The method of claim 5, wherein the balanced code is sparse.

9. The method of claim 8, wherein the average number of zero values across multiple transmissions and all integrated circuit inductors is larger than 1.

10. The method of claim 1, wherein the controlled current flow continues for a duration of a symbol period, after which a subsequent encoded word is transmitted.

11. The method of claim 1, wherein the controlled current flow ends during a symbol period, before current flows for a subsequent encoded word.

12. A system for communication of digital information between a transmitting and a receiving integrated circuit, each integrated circuit incorporating an array of inductive elements derived from integrated circuit wiring layers, the system incorporating the elements of:
   a transmit encoder converting a word of digital information into an encoded word comprising symbol values selected from a set of symbol values such that a sum of symbol values of the encoded word equals a predetermined value;

a plurality of transmit drivers converting symbol values of the encoded word into current flows in the inductive elements of the transmitting integrated circuit array of inductive elements, with the current flow in each inductive element being proportional to a corresponding symbol value of the encoded word;

receive sensors connected to the array of inductors of the receiving integrated circuit, with each receive sensor producing a response derived from induced current of one inductor of the array of inductors; and a receive decoder converting the receive sensor responses into a received word of digital information.

13. The system of claim 12, wherein the set of symbol values consists of +1, 0, and −1.

14. The system of claim 13, wherein the predetermined value is zero.

15. The system of claim 14, wherein a duration of transmit driver current flow is less than the overall transmission time for one digital information word.

* * * * *